(12) United States Patent
Kimura et al.

(10) Patent No.: US 11,279,504 B2
(45) Date of Patent: Mar. 22, 2022

(54) ROBOT SYSTEM AND CONTROL METHOD THEREOF

(71) Applicant: HITACHI TRANSPORT SYSTEM, LTD., Tokyo (JP)

(72) Inventors: Nobutaka Kimura, Tokyo (JP); Fumiko Beniyama, Tokyo (JP); Yasuki Shimazu, Tokyo (JP); Yoshihiro Nishida, Tokyo (JP); Takao Ueki, Tokyo (JP)

(73) Assignee: HITACHI TRANSPORT SYSTEM, LTD., Tokyo (JP)

( * ) Notice: Subject to any disclaimer, the term of this patent is extended or adjusted under 35 U.S.C. 154(b) by 271 days.

(21) Appl. No.: 16/555,615

(22) Filed: Aug. 29, 2019

(65) Prior Publication Data

US 2020/0078935 A1 Mar. 12, 2020

(30) Foreign Application Priority Data

Sep. 7, 2018 (JP) .............................. JP2018-168088

(51) Int. Cl.
*B65B 5/10* (2006.01)
*B65B 35/36* (2006.01)
(Continued)

(52) U.S. Cl.
CPC ................. *B65B 5/105* (2013.01); *B25J 9/10* (2013.01); *B25J 9/1679* (2013.01); *B25J 9/1689* (2013.01);
(Continued)

(58) Field of Classification Search
CPC . B65B 5/105; B65B 35/38; B65B 5/08; B25J 15/0616; G05B 2219/40074
See application file for complete search history.

(56) References Cited

U.S. PATENT DOCUMENTS 5,079,903 A * 1/1992 Hakansson ............. B65B 35/38
294/65
5,943,842 A * 8/1999 de Koning .............. B65B 35/38
53/247

(Continued)

FOREIGN PATENT DOCUMENTS

JP 2008-013206 A 1/2008
WO 2017/149616 A1 9/2017

OTHER PUBLICATIONS

Chinese Office Action dated Mar. 2, 2021 for Chinese Patent Application No. 201910719640.0.
(Continued)

*Primary Examiner* — Thomas Randazzo
(74) *Attorney, Agent, or Firm* — Volpe Koenig

(57) ABSTRACT

A robot system has a manipulator that conveys a conveying object to a conveyance destination having a bottom surface and a wall surface connected to the bottom surface. The system includes: a first process in which the manipulator puts a first conveying object on the bottom surface of the conveyance destination; a second process in which the manipulator conveys a second conveying object to a position that does not come into contact with the first conveying object on the bottom surface of the conveyance destination; and a third process in which the manipulator moves the second conveying object in the direction of the first conveying object from the position that does not come into (Continued)

contact with the first conveying object, and moves the first conveying object by further moving the second conveying object after coming into contact with the first conveying object.

13 Claims, 24 Drawing Sheets

(51) Int. Cl.
| | |
|---|---|
| *B65B 5/08* | (2006.01) |
| *B25J 9/10* | (2006.01) |
| *B25J 9/16* | (2006.01) |
| *B25J 13/02* | (2006.01) |
| *B65G 1/137* | (2006.01) |
| *B65G 47/91* | (2006.01) |
| *G05B 19/418* | (2006.01) |
| *G06Q 50/28* | (2012.01) |
| *B65B 35/38* | (2006.01) |
| *B25J 9/00* | (2006.01) |

(52) U.S. Cl.
CPC ............... *B25J 13/02* (2013.01); *B65B 5/08* (2013.01); *B65B 35/36* (2013.01); *B65B 35/38* (2013.01); *B65G 1/1378* (2013.01); *B65G 47/91* (2013.01); *G05B 19/4182* (2013.01); *G06Q 50/28* (2013.01); *B25J 9/0093* (2013.01)

(56) References Cited

U.S. PATENT DOCUMENTS

| | | | |
|---|---|---|---|
| 2012/0233967 A1* | 9/2012 | Bellante | B65B 5/105 53/443 |
| 2013/0017052 A1* | 1/2013 | Dorner | B25J 9/0084 414/794.4 |
| 2015/0308466 A1* | 10/2015 | Girtman | F15B 15/149 92/163 |
| 2016/0272354 A1* | 9/2016 | Nammoto | B25J 9/0087 |
| 2017/0036794 A1* | 2/2017 | Sassi | B25J 15/0052 |
| 2018/0071915 A1* | 3/2018 | Khatib | B25J 9/10 |
| 2019/0185267 A1* | 6/2019 | Mattern | B25J 9/1679 |
| 2019/0255704 A1* | 8/2019 | Johnson | B25J 9/0009 |
| 2019/0322451 A1* | 10/2019 | Bastian, II | B65B 35/16 |
| 2019/0375521 A1* | 12/2019 | Hasegawa | B25J 9/0087 |

OTHER PUBLICATIONS

Partial European Search Report dated Jan. 30, 2020 for the European Patent Application No. 19192899.3.

Emika, "Boxes into box," YouTube, Retrieved from the Internet: URL: https://www.youtube.com/watch?v=uxD_78_xbNg (May 30, 2018).

* cited by examiner

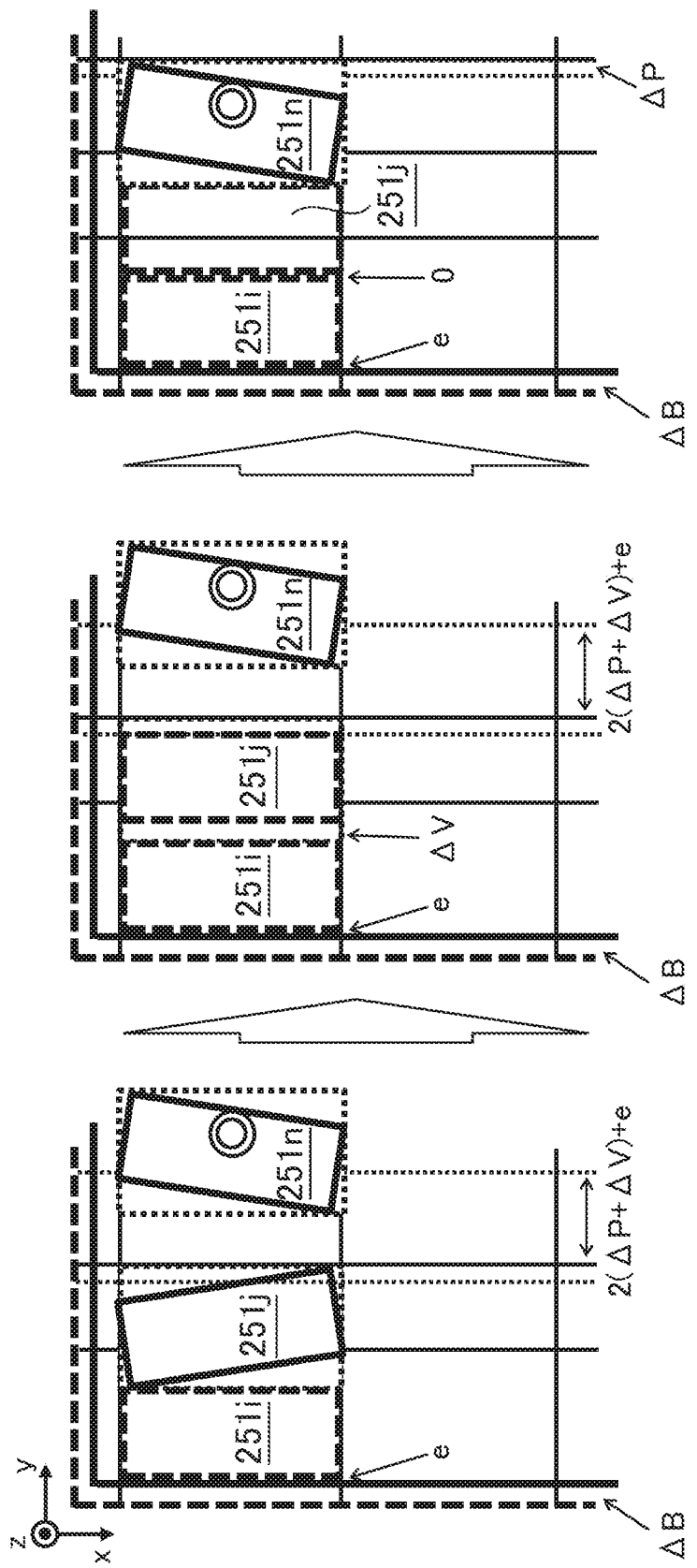

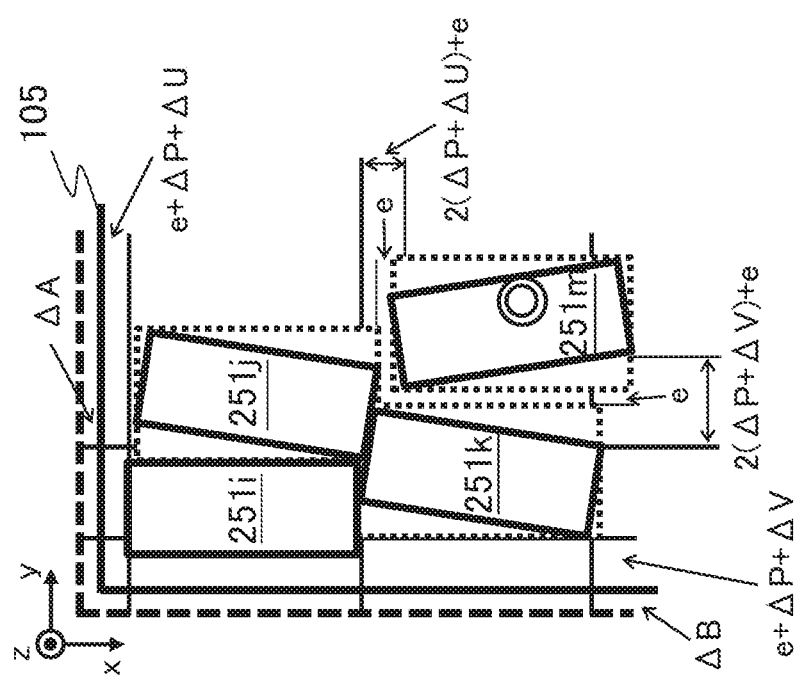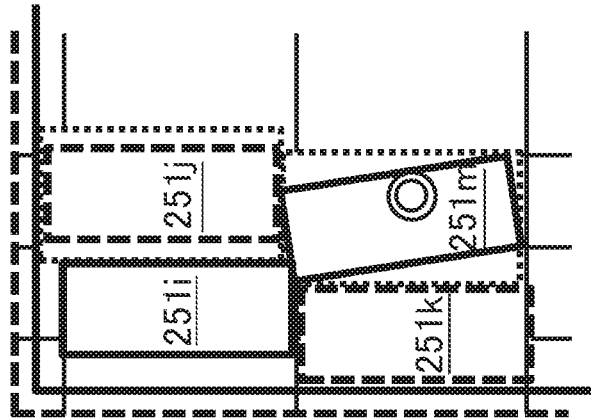

ROBOT SYSTEM AND CONTROL METHOD THEREOF

CLAIM OF PRIORITY

The present application claims priority from Japanese patent application JP 2018-168088 filed on Sep. 7, 2018, the content of which is hereby incorporated by reference into this application.

BACKGROUND

The present invention relates to a robot system used in a warehouse and the like.

One of techniques of automating boxing work of articles is disclosed in, for example, Japanese Unexamined Patent Application Publication No. 2008-13206. Japanese Unexamined Patent Application Publication No. 2008-13206 describes that "a boxing apparatus in which a series of housing units that can house articles are formed on an endless track by and between a series of partition plates that extend in parallel from the endless track while intersecting with the travelling direction of the endless track, the articles are housed in the series of housing units at a housing position where the partition plates extend obliquely upward from the endless track at a reversing part where the endless track reverses, the articles are pushed out from the series of housing units to forma group of articles at an alignment position where the series of housing units are aligned, and the group of articles are pushed in an outer packaging box has a plurality of light shielding shape detectors in which a plurality of optical paths for detection extending in the tangential direction in the housing position is arranged in parallel in the horizontal direction on the outer circumferential side of a circular arc formed by connecting stretching ends of the series of partition plates at the reversing part, and a control apparatus that controls the endless track on the basis of a detection signal of the light shielding shape detector".

SUMMARY

In the case where a plurality of articles having the same shape (including the size) is stored in a box, the articles can be stored without gaps between the articles by using the apparatus described in Japanese Unexamined Patent Application Publication No. 2008-13206 if the shape has been known.

However, in the case where articles are stored into a box in accordance with an order from a delivery destination in a warehouse that deals with products with a variety of items, the items and number of articles to be stored into the box for each delivery destination are different, or articles of a plurality of items are mixed in one box in some cases. In such a case, it is necessary to perform work of storing articles having different shapes into a box one by one in accordance with an order.

Namely, in the case where the work of storing a plurality of articles having different shapes is automated by a robot, it is necessary to perform a process in which the robot recognizes the position and shape of each article to be stored and stores each article into a box by gripping the same. At this time, the position of the article recognized by the robot is different from that of the article in a real space, and thus it is necessary to store the articles into a box while reducing gaps between the articles as small as possible in order to improve the housing efficiency in the box. However, this point is not taken into account in the technique described in Japanese Unexamined Patent Application Publication No. 2008-13206.

In order to solve the above-described problem, the present invention provides a robot system having a manipulator that conveys a conveying object to a conveyance destination having a bottom surface and a wall surface connected to the bottom surface. The system includes: a first process in which the manipulator puts a first conveying object on the bottom surface of the conveyance destination; a second process in which the manipulator conveys a second conveying object to a position that does not come into contact with the first conveying object on the bottom surface of the conveyance destination; and a third process in which the manipulator moves the second conveying object in the direction of the first conveying object from the position that does not come into contact with the first conveying object, and moves the first conveying object by further moving the second conveying object after coming into contact with the first conveying object.

According to one aspect of the present invention, when a plurality of articles having different shapes is stored into a box, it is possible to improve the housing efficiency in the box by reducing gaps between the articles as small as possible.

Problems, configurations, and effects other than those described above will be clarified by the following description of an embodiment.

BRIEF DESCRIPTION OF THE DRAWINGS

FIG. 16A is a second explanatory diagram of an actual installation position including the maximum error in the y direction in the case where an article is additionally installed using the suction hand according to the embodiment of the present invention;

FIG. 16B is a second explanatory diagram of an actual installation position including the maximum error in the y direction in the case where an article is additionally installed using the suction hand according to the embodiment of the present invention;

FIG. 16C is a second explanatory diagram of an actual installation position including the maximum error in the y direction in the case where an article is additionally installed using the suction hand according to the embodiment of the present invention;

FIG. 17A is an explanatory diagram of an actual installation position including the maximum error in the case where an article is additionally installed using the suction hand according to the embodiment of the present invention;

FIG. 17B is an explanatory diagram of an actual installation position including the maximum error in the case where an article is additionally installed using the suction hand according to the embodiment of the present invention;

DETAILED DESCRIPTION

Hereinafter, an embodiment of the present invention will be described with reference to the drawings.

Figure 1:
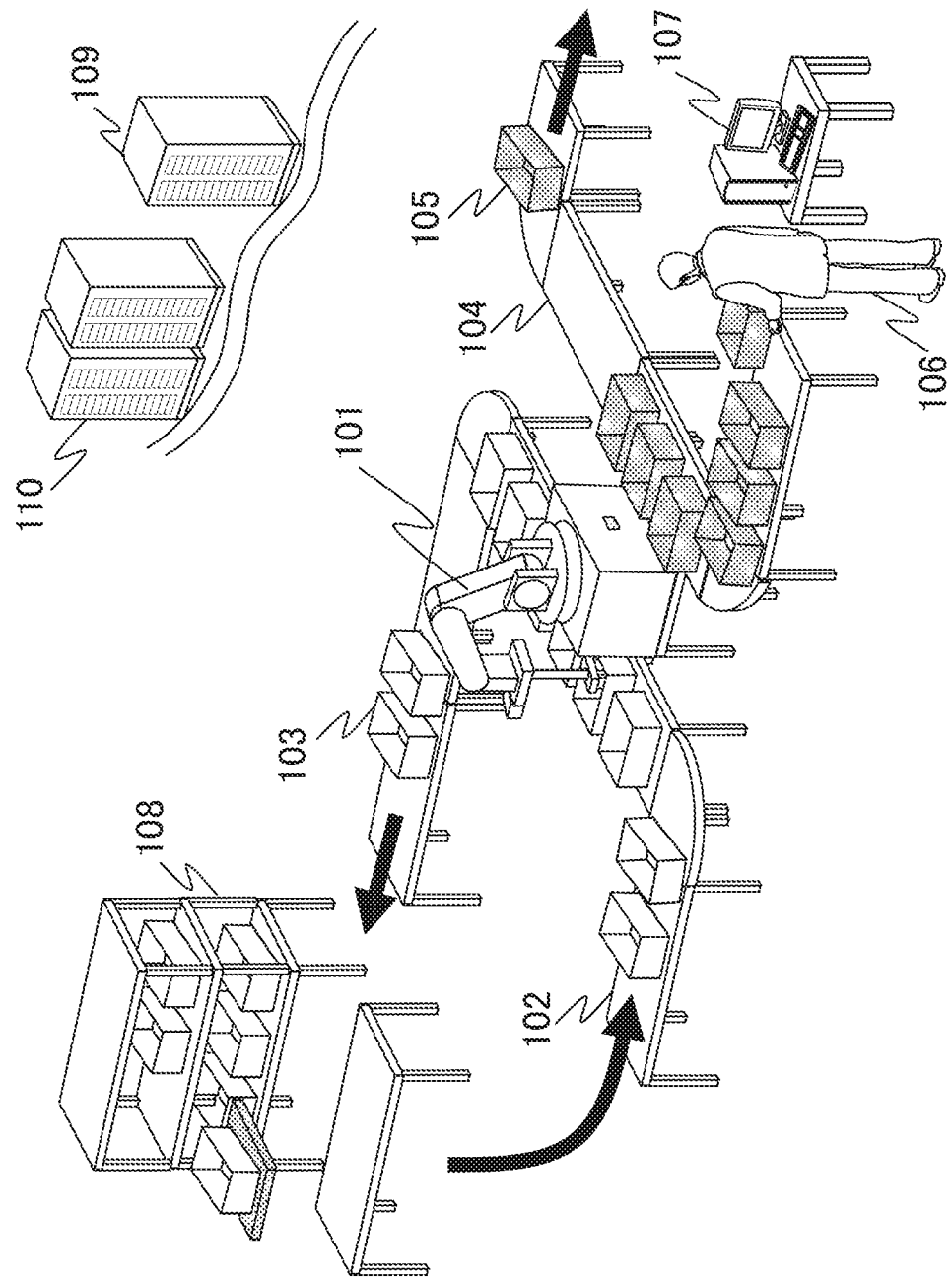
FIG. 1 is an explanatory diagram of a warehouse in which a robot system according to an embodiment of the present invention is used.

FIG. 1 is an explanatory diagram of a warehouse in which a robot system according to the embodiment of the present invention is used.

Specifically, FIG. 1 shows an example of a sorting area where articles to be delivered are sorted for each delivery destination in the warehouse. An automatic rack 108 is installed in the sorting area. The automatic rack stores a plurality of storage boxes 103, and each storage box stores one or more articles. The storage box 103 storing an ordered article is taken out from the automatic rack 108, and is placed on a storage box conveyor 102 to be conveyed to a working area for a robot 101.

In the working area, the robot 101 sequentially takes out the articles according to the number of orders from the storage box 103, and stores the same into a sorting box 105. This work is also referred to as picking or sorting. Thereafter, the storage box 103 is conveyed to the outside of the working area for the robot 101 by the storage box conveyor 102, and is returned to the automatic rack 108.

On the other hand, a worker 106 places the sorting box 105 on a sorting box conveyor 104 in accordance with an instruction output from an instruction terminal 107. The sorting box conveyor 104 conveys the sorting box to the working area for the robot 101. When the robot 101 stores an article taken out from the storage box 103 into the sorting box 105, the sorting box conveyor 104 then conveys the sorting box 105 to the outside of the working area for the robot 101.

When all the articles to be stored are stored into the sorting box 105 in accordance with orders, the sorting box conveyor 104 conveys the sorting box 105 to a work place (not shown in the drawing) for the post-process. Finally, the article stored in the sorting box 105 is delivered to a delivery destination for the order corresponding to the sorting box 105.

A host system 110 is a computing system that manages the entire warehouse, and an entire management computer 109 is a computing system that manages work such as sorting in the warehouse. For example, the host system 110 may accept an order from each delivery destination to issue an instruction of sorting work relevant to the order to the entire management computer 109.

In order to carry out the sorting work for the order, the entire management computer 109 may create instructions for the automatic rack 108, the worker 106, the robot 101, the storage box conveyor 102, and the sorting box conveyor 104, and may transmit the same thereto. The instruction terminal 107 receives the instruction for the worker 106, and outputs the same. When the sorting work is completed, the host system 110 may receive the report from the entire management computer 109, and may instruct a relevant system to execute the next process such as packing.

FIGS. 2A, 2B, 2C, 2D and 2E are explanatory diagrams of the robot 101 according to the embodiment of the present invention.

Figure 2A:
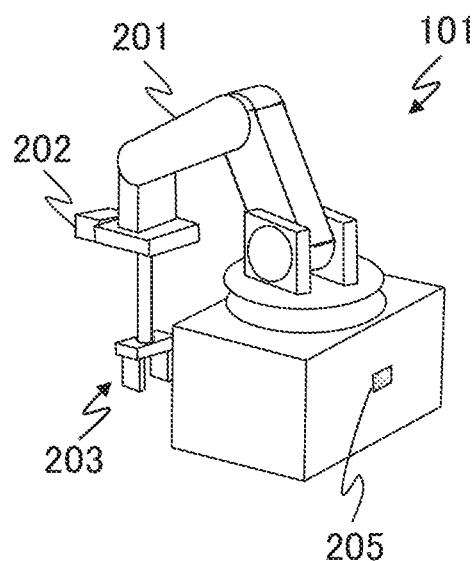
FIG. 2A is an explanatory diagram of a robot according to the embodiment of the present invention.
Figure 2B:
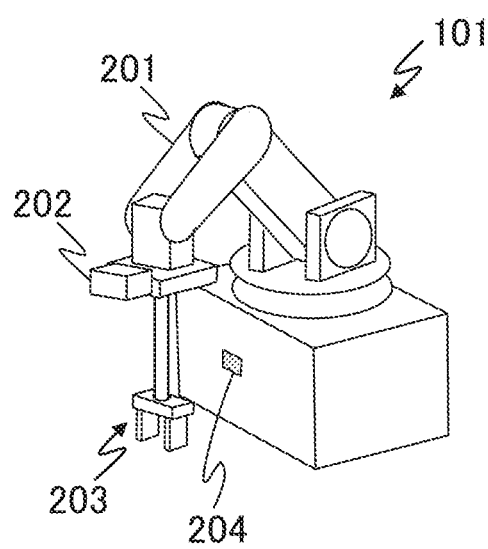
FIG. 2B is an explanatory diagram of a robot according to the embodiment of the present invention.
Figure 2C:
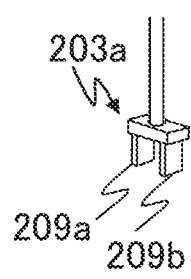
FIG. 2C is an explanatory diagram of a robot according to the embodiment of the present invention.
Figure 2D:
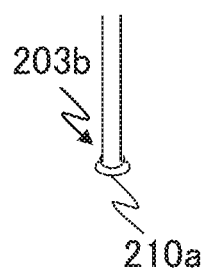
FIG. 2D is an explanatory diagram of a robot according to the embodiment of the present invention.
Figure 2E:
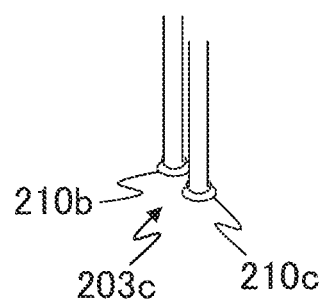
FIG. 2E is an explanatory diagram of a robot according to the embodiment of the present invention.

Specifically, the shapes of the entire robot 101 observed from different directions are shown in FIG. 2A and FIG. 2B. The shapes of different kinds of hands 203 are shown in FIG. 2C to FIG. 2E.

The robot 101 has an arm 201, an article recognition sensor 202, the hand 203, a storage box recognition sensor 204, and a sorting box recognition sensor 205. The hand 203 is attached to a tip end of the arm 201, and grips an article. The article recognition sensor 202 recognizes an article to be gripped by the hand 203. The article recognition sensor 202 may be, for example, a camera or a distance image camera that is attached to a tip end of the arm 201 to photograph the direction of the article gripped by the hand 203.

The arm 201 has a plurality of joints, and the hand 203 can be moved to an arbitrary position in the movable range of the arm 201 by driving the joints.

The storage box recognition sensor 204 recognizes the storage box 103 conveyed to the working area for the robot 101. The storage box recognition sensor 204 may be, for example, a camera, a distance image camera, a bar code reader, or the like that is installed on a side surface of the robot 101 facing a region in the working area to which the storage box 103 is conveyed. In the case where the storage box recognition sensor 204 is a bar code reader, each storage box 103 needs to have a bar code containing predetermined information at a position that can be read by the storage box recognition sensor 204 when the storage box 103 is conveyed to the working area.

The sorting box recognition sensor 205 recognizes the sorting box 105 conveyed to the working area for the robot 101. The sorting box recognition sensor 205 may be, for example, a camera, a distance image camera, a bar code reader, or the like that is installed on a side surface of the robot 101 facing a region in the working area to which the sorting box 105 is conveyed. In the case where the sorting box recognition sensor 205 is a bar code reader, each sorting box 105 needs to have a bar code containing predetermined information at a position that can be read by the sorting box recognition sensor 205 when the sorting box 105 is conveyed to the working area.

The hand 203 has a mechanism to grip an article. For example, the hand 203 may be a finger-type hand 203a having a plurality of fingers 209 (for example, fingers 209a and 209b) gripping an article while being sandwiched as shown in FIG. 2C. Alternatively, the hand 203 may be a suction hand 203b that has a suction pad 210a generating a negative pressure to grip an article by suction using the negative pressure as shown in FIG. 2D. Alternatively, the hand 203 may be a double suction hand 203c that has two suction pads 210b and 210c and can grip two articles at the same time as shown in FIG. 2E.

It should be noted that in the case where an explanation common to all the types of hands such as the finger-type hand 203a or the suction hand 203b is made in the embodiment, these are collectively described as the hand 203 in some cases. In addition, in the case where an explanation common to both of the fingers 209a and 209b of the finger-type hand 203a is made, these are collectively described as the finger 209 in some cases. The same applies to other reference numbers such as an article 251.

Figure 3A:
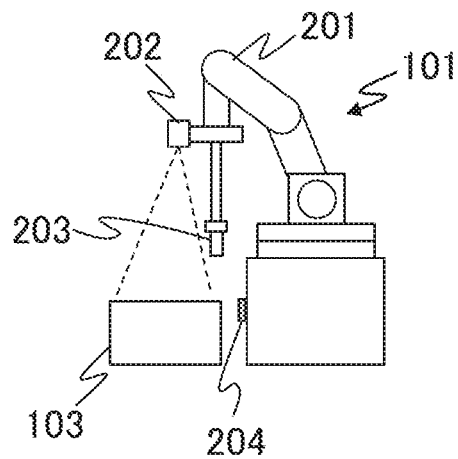
FIG. 3A is an explanatory diagram of recognition errors of an article caused by the robot according to the embodiment of the present invention.
Figure 3B:
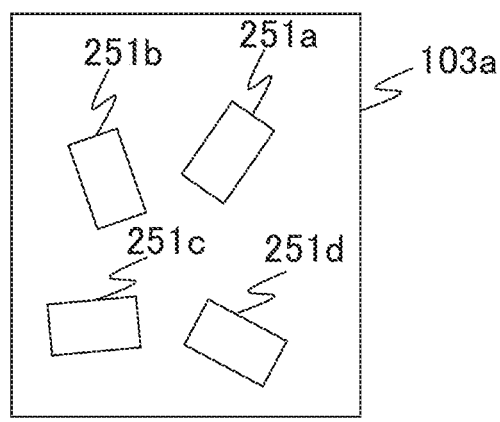
FIG. 3B is an explanatory diagram of recognition errors of an article caused by the robot according to the embodiment of the present invention.
Figure 3C:
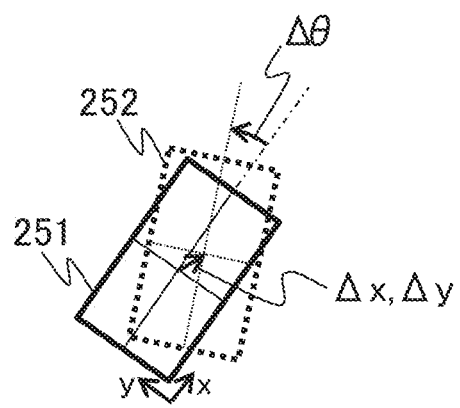
FIG. 3C is an explanatory diagram of recognition errors of an article caused by the robot according to the embodiment of the present invention.

FIGS. 3A, 3B and 3C are explanatory diagrams of recognition errors of an article caused by the robot 101 according to the embodiment of the present invention.

As shown in FIG. 3A, in the case where the storage box recognition sensor 204 recognizes the storage box 103 conveyed to the working area, the article recognition sensor 202 photographs the direction of the storage box 103. FIG. 3B is a plan view for showing an example of arrangement of four articles 251 (namely, articles 251a to 251d) stored in a storage box 103a that is one of the storage boxes 103. FIG. 3C shows an example of a difference between the true position of the article 251 shown by a rectangle of the thick solid line and a recognition result 252 shown by a rectangle of the thick dotted line.

In the case where the long-side direction of the article 251 is an x direction and the direction perpendicular thereto is a y direction, recognition errors include $\Delta x$ and $\Delta y$ that are differences between the coordinate values of the center position of the article 251 and the coordinate values of the center position of the recognition result 252 and $\Delta\theta$ that is a difference between the direction of the center line of the article 251 and the direction of the center line of the recognition result 252. The former is also described as a positional error, and the latter is also described as a postural error.

Figure 4A:
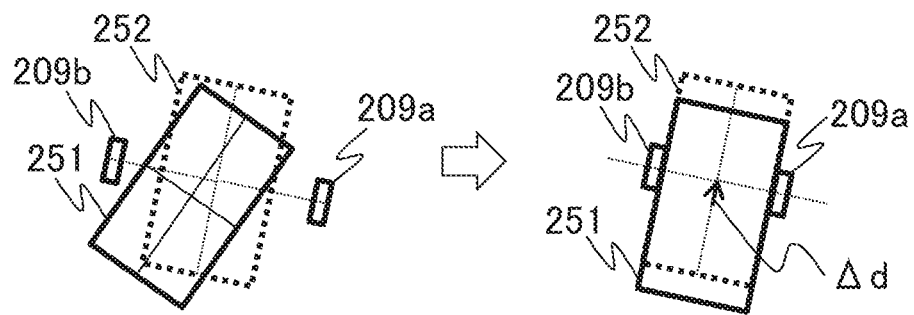
FIG. 4A is an explanatory diagram of recognition errors of an article when the robot according to the embodiment of the present invention grips the article.
Figure 4B:
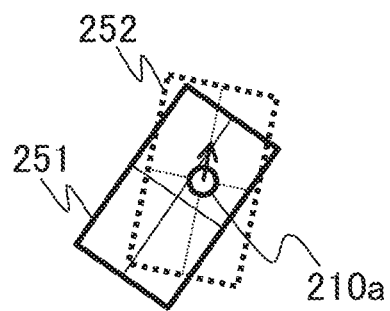
FIG. 4B is an explanatory diagram of recognition errors of an article when the robot according to the embodiment of the present invention grips the article.

FIGS. 4A and 4B are explanatory diagrams of recognition errors of an article when the robot 101 according to the embodiment of the present invention grips the article.

FIG. 4A is a plan view for showing an example of a relation among the fingers 209, the actual position of the article 251, and the recognition result 252 of the article 251 in the case where the article 251 is gripped using the finger-type hand 203a. The positional errors $\Delta x$ and $\Delta y$ and the postural error $\Delta\theta$ as similar to FIG. 3C are present between the article 251 and the recognition result 252 in FIG. 4A. The robot 101 determines the grip position by the finger-type hand 203a on the basis of the recognition result 252.

For example, in the case where the article 251 and the recognition result 252 have rectangular shapes as shown in FIG. 4A, the robot 101 sandwiches the centers of the long sides on the both sides of the recognition result 252 from the directions perpendicular to the long sides using the fingers 209a and 209b. As a result, the posture of the article 251 is changed, and the direction of the center line of the article 251 matches the direction of the center line of the recognition result 252. Namely, the postural error is accordingly resolved.

Further, the position of the article 251 is changed to the direction (the direction perpendicular to the long sides of the recognition result 252 in the example of FIG. 4A, and the direction is also described as the open/close direction of the fingers 209 below) where the fingers 209a and 209b move when sandwiching the article 251 by the grip, and an error in the direction perpendicular thereto remains. The amount $\Delta d$ of the error is calculated by Equation (1).

$$\Delta d = \Delta x \cdot \cos \Delta\theta + \Delta y \cdot \sin \Delta\theta \quad (1)$$

Here, $\Delta d$ represents the amount of the error remaining in the direction perpendicular to the open/close direction of the fingers 209.

On the other hand, FIG. 4B is a plan view for showing an example of a relation among the suction pad 210a, the article 251, and the recognition result 252 of the article 251 in the case where the article 251 is gripped using the suction hand 203b. The robot 101 determines the center position of the recognition result 252 as the grip position by the suction hand 203b. The grip position is shifted from the actual center of the article 251 by only $\Delta x$ and $\Delta y$. Unlike the case of the finger-type hand 203a, even if the suction hand 203b grips the position, the posture of the article 251 is not changed. Thus, the positional errors $\Delta x$ and $\Delta y$ and the postural error $\Delta\theta$ still remain.

Next, storage of an article by the robot 101 having the finger-type hand 203a will be described with reference to FIG. 5 to FIG. 9.

FIGS. 5A, 5B, 5C and 5D are explanatory diagrams of gripping of an article by the finger-type hand 203a according to the embodiment of the present invention.

Figure 5A:
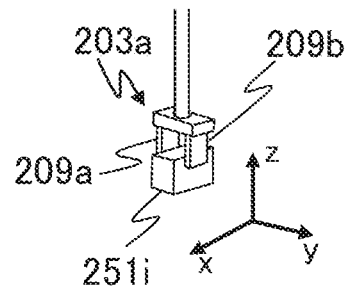
FIG. 5A is an explanatory diagram of gripping of an article by a finger-type hand according to the embodiment of the present invention.
Figure 5B:
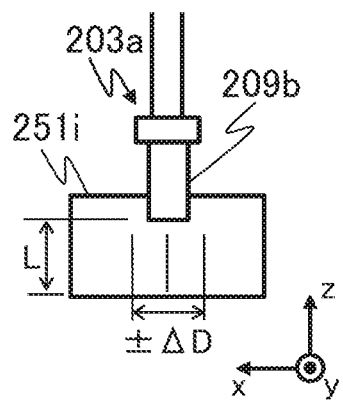
FIG. 5B is an explanatory diagram of gripping of an article by a finger-type hand according to the embodiment of the present invention.
Figure 5C:
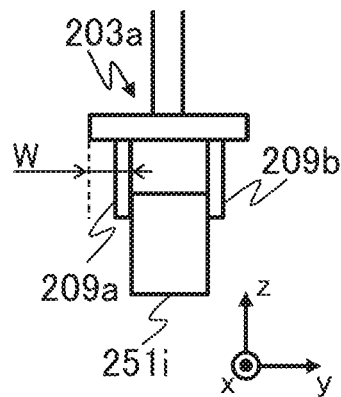
FIG. 5C is an explanatory diagram of gripping of an article by a finger-type hand according to the embodiment of the present invention.
Figure 5D:
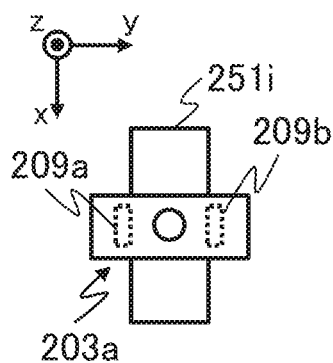
FIG. 5D is an explanatory diagram of gripping of an article by a finger-type hand according to the embodiment of the present invention.

FIG. 5A is a perspective view of the finger-type hand 203a sandwiching and gripping an article 251i using the fingers 209a and 209b. FIG. 5B is a side view obtained by viewing the finger-type hand 203a and the article 251i of FIG. 5A from the y direction (namely, the direction parallel to short sides of the article 251i in a horizontal surface). FIG. 5C is a side view obtained by viewing the finger-type hand 203a and the article 251i of FIG. 5A from the x direction (namely, the direction parallel to long sides of the article 251i in a horizontal surface). FIG. 5D is a plan view obtained by viewing the finger-type hand 203a and the article 251i of FIG. 5A from the z direction (namely, the upper direction).

The distance W from an end of the open/close direction of the finger 209 to an inner end of the finger 209 when gripping the article 251i in the finger-type hand 203a indicates the size of a space that needs to be secured between an inner wall surface of the sorting box 105 and a side surface of the article 251i in order to insert the finger 209. The distance W is calculated on the basis of information of the preliminarily-retained size of the finger-type hand 203a and information of the size of the article 251i (see FIG. 28).

The maximum error ΔD of the grip position of the article 251i is calculated by Equation (2).

$$\Delta D = \Delta P \times (\cos \Delta\Omega \cdot \sin \Delta\Omega) \quad (2)$$

Here, ΔD represents the maximum error of the grip position of the article 251i, ΔP denotes an article position recognition maximum error, and ΔΩ denotes an article posture recognition maximum error.

Further, the ideal height L of the tip end of the finger 209 when gripping the article 251i is calculated by Equation (3). It should be noted that the height of the tip end of the finger 209 in this case means a distance from the bottom surface of the article 251i to the tip end of the finger 209. In addition, "ideal" means "target".

$$L = H - (L \min + \Delta Q) \quad (3)$$

Here, L represents the ideal height of the tip end of the finger 209 when gripping the article 251i, H represents the height of the article 251i, ΔQ represents an article height recognition maximum error, and Lmin represents a minimum grip amount (namely, the minimum value of a distance from the upper surface of the article 251i to the tip end of the finger 209 that needs to be secured to stably grip the article 251i).

Figure 6:
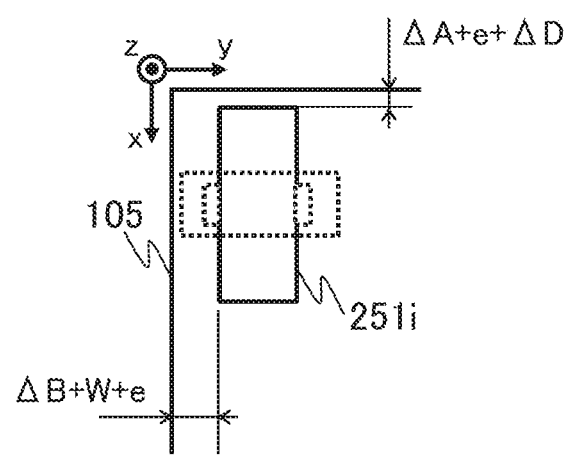
FIG. 6 is an explanatory diagram of the ideal installation position of an article that is initially stored into a sorting box by the finger-type hand according to the embodiment of the present invention.

FIG. 6 is an explanatory diagram of the ideal installation position of an article that is initially stored into the sorting box 105 by the finger-type hand 203a according to the embodiment of the present invention.

Specifically, FIG. 6 is a plan view for showing the ideal installation position of the article 251i in the sorting box 105 when the article 251i is initially stored using the finger-type hand 203a into the sorting box 105 in which no article is stored yet. The ideal installation position is a position where a distance between a short side of the article 251i and a wall surface of the sorting box 105 parallel to the short side is ΔA+e+ΔD and a distance between a long side of the article 251i and a wall surface of the sorting box 105 parallel to the long side is ΔB+W+e.

Here, ΔA represents the maximum error of the installation position of the article 251i in the x direction caused by the recognition error of the sorting box 105, ΔB represents the maximum error of the installation position of the article 251i in the y direction caused by the recognition error of the sorting box 105, and "e" represents a margin (a predetermined value equal to or larger than 0).

ΔA and ΔB are calculated by Equation (4) and Equation (5), respectively.

$$\Delta A = \Delta X + a/2 \times (1 - \cos \Delta\Gamma) + b/2 \times \sin \Delta\Gamma \quad (4)$$

$$\Delta B = \Delta Y \pm b/2 \times (1 - \cos \Delta\Gamma) + a/2 \times \sin \Delta\Gamma \quad (5)$$

Here, "a" represents the length of the sorting box 105 (namely, the length of the sorting box 105 in the direction parallel to the surface of the finger 209 contact with the article 251i), "b" represents the width of the sorting box 105 (namely, the length of the sorting box 105 in the open/close direction of the finger 209), ΔX represents the recognition maximum error of the position of the sorting box 105 in the x direction, ΔY represents the recognition maximum error of the position of the sorting box 105 in the y direction, and ΔΓ represents the recognition maximum error of the posture of the sorting box 105.

It should be noted that ΔA and ΔB are calculated in the case where the position of the sorting box 105 is recognized using the sorting box recognition sensor 205. On the other hand, the positional error of the sorting box 105 is negligibly small in such a case that, for example, the sorting box conveyor 104 is provided with a mechanism of always stopping the sorting box 105 at a fixed position, ΔA and ΔB can be 0.

In addition, when the finger-type hand 203a grips the article 251i to be inserted into the sorting box 105 from an opening portion at an upper end of the sorting box 105 while being moved into the direction of the bottom surface, it is necessary to secure a distance of ΔA+e+ΔD between a wall surface parallel to the y direction and the article 251i. However, the article 251i may be thereafter moved in the −x direction by only the margin e (namely, the article 251i is brought closer to the wall surface direction by only the margin e) to be installed on the bottom surface. In this case, a distance between a wall surface parallel to the y direction and the article 251i is ΔA+ΔD.

Figure 7:
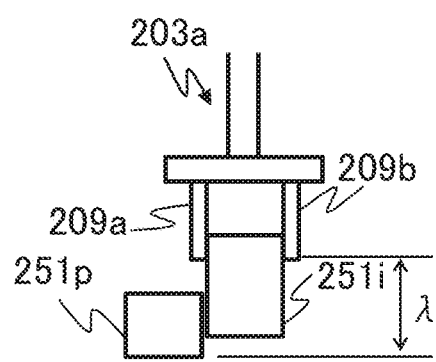
FIG. 7 is an explanatory diagram of the height of the tip end of a finger at the time of shift movement of an article by the finger-type hand according to the embodiment of the present invention.

FIG. 7 is an explanatory diagram of the height of the tip end of the finger 209 at the time of shift movement of an article by the finger-type hand 203a according to the embodiment of the present invention.

Specifically, FIG. 7 explains the height from the bottom surface of the sorting box 105 to the tip end of the finger 209 in such a case that when the article 251i is stored using the finger-type hand 203a into the sorting box 105 in which an article 251p is already stored, the article 251i is horizontally moved to the direction of the article 251p after the article 251i is moved from an opening portion of the sorting box 105 to near the bottom surface.

It should be noted that movement including at least components in the vertical direction in such a case that the article 251 is moved from an opening portion of the sorting box 105 to near the bottom surface is also described as "insertion", and movement including at least components in the horizontal direction in such a case that the article 251 having reached near the bottom surface is brought closer to a wall surface of the sorting box 105 or the direction of another article 251 already installed on the bottom surface is also described as "shift movement". As will be described later, the moving direction at the time of insertion of the article 251 is different from the moving direction at the time of shift movement. It should be noted that the sorting box 105 is not illustrated in FIG. 7 for convenience of explanation.

The minimum height (namely, the minimum distance from the bottom surface of the sorting box 105) λ min of the tip end of the finger 209 at the time of shift movement of the article 251$i$ is calculated by Equation (6).

$$\lambda \min = L + \Delta Q + e \quad (6)$$

Here, λ min represents the minimum height of the tip end of the finger 209 at the time of shift movement of the article 251$i$.

When pushing around an upper surface of the article 251$p$ at the time of shift movement of the article 251$i$, the article 251$p$ falls without being slid on the floor surface in some cases. Therefore, the article 251$i$ is desirably shifted and moved at a position as low as possible. However, if the position is too low, the finger 209 of the hand 203$a$ abuts on the article 251$p$ in some cases. Based on the above, the ideal height (namely, the ideal distance from the bottom surface of the sorting box 105) λ of the tip end of the finger 209 at the time of shift movement of the article 251$i$ is calculated by Equation (8) in the case where Equation (7) is established, and is calculated by Equation (10) in the case where Equation (9) is established.

$$\lambda \min \geq Hp + e \quad (7)$$

$$\lambda = \lambda \min \quad (8)$$

$$\lambda \min < Hp + e \quad (9)$$

$$\lambda = Hp + e \quad (10)$$

Here, λ represents the ideal height of the tip end of the finger 209 at the time of shift movement of the article 251$i$, and Hp represents the height of the adjacent article 251$p$ that is already installed.

Accordingly, even in the case where the recognition error of the height of the article 251 occurs, the height of the finger-type hand 203$a$ can be controlled so that the height of the bottom surface of the article 251$i$ is higher than the height of the bottom surface of the article 251$p$ and the height of the bottom surface of the article 251$i$ is lower than the height of the upper surface of the article 251$p$. In addition, the shift movement of the article 251$i$ at a low position can be realized by the above-described control while satisfying the conditions where the finger 209 of the finger-type hand 203$a$ does not hit the article 251$p$.

FIG. 8 are explanatory diagrams of an ideal installation position in the case where an article is additionally installed using the finger-type hand 203$a$ according to the embodiment of the present invention.

In the example, an article 251$m$ is newly stored in a state where articles 251$i$, 251$j$, and 251$k$ are already stored. The articles 251$i$ and 251$j$ are installed adjacent to each other in the y direction, and the articles 251$i$ and 251$k$ are installed adjacent to each other in the x direction. All the articles are installed so that the long sides thereof are parallel to the x direction. The position of the article 251$m$ to be installed is a position where the side surface of the article 251$m$ on the short-side side comes into contact with the article 251$j$ and the side surface thereof on the long-side side comes into contact with the article 251$k$.

Figure 8E:
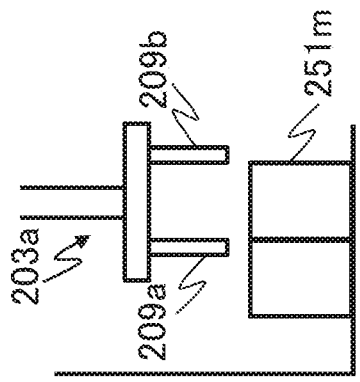
FIG. 8E is an explanatory diagram of an ideal installation position in the case where an article is additionally installed using the finger-type hand according to the embodiment of the present invention.
Figure 8F:
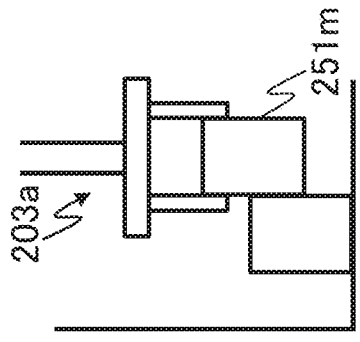
FIG. 8F is an explanatory diagram of an ideal installation position in the case where an article is additionally installed using the finger-type hand according to the embodiment of the present invention.

The robot 101 inserts the article 251$m$ using the finger-type hand 203$a$ into a position apart from the side surface of the article 251$j$ adjacent to the direction (the x direction in the example of FIG. 8) Parallel to the surface of the finger 209 by only 2×ΔD+e and apart from the side surface of the article 251$k$ adjacent to the open/close direction (the y direction in the example of FIG. 8) of the finger 209 by only e. A plan view of the arrangement of each article 251 at this time is shown in FIG. 8A, and a side view viewed from the x direction is shown in FIG. 8B. As shown in FIG. 8B, the article 251$m$ is still gripped by the finger-type hand 203$a$ at this time, and does not come into contact with the bottom surface of the sorting box 105.

Thereafter, the robot 101 moves the article 251$m$ in the x direction by only −(2×ΔD+e) and in the y direction by only −e. Accordingly, the side surface of the article 251$m$ on the short-side side comes into contact with the article 251$j$, and the side surface thereof on the long-side side comes into contact with the article 251$k$. A plan view of the arrangement of each article 251 at this time is shown in FIG. 8C, and a side view viewed from the x direction is shown in FIG. 8D.

When the finger 209 releases the article 251$m$ thereafter, the article 251$m$ comes into contact with the bottom surface of the sorting box 105. A plan view of the arrangement of each article 251 at this time is shown in FIG. 8E, and a side view viewed from the x direction is shown in FIG. 8F.

Figure 8C:
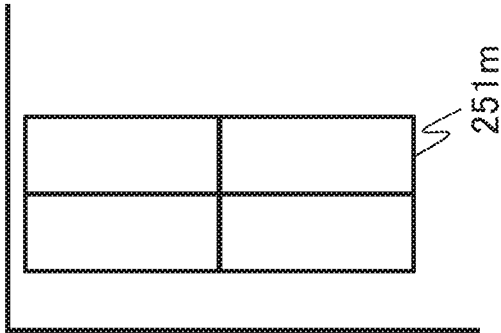
FIG. 8C is an explanatory diagram of an ideal installation position in the case where an article is additionally installed using the finger-type hand according to the embodiment of the present invention.
Figure 8D:
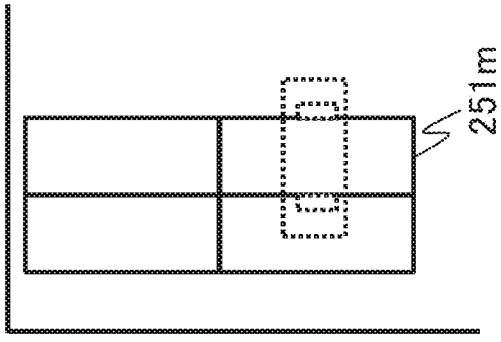
FIG. 8D is an explanatory diagram of an ideal installation position in the case where an article is additionally installed using the finger-type hand according to the embodiment of the present invention.
Figure 8A:
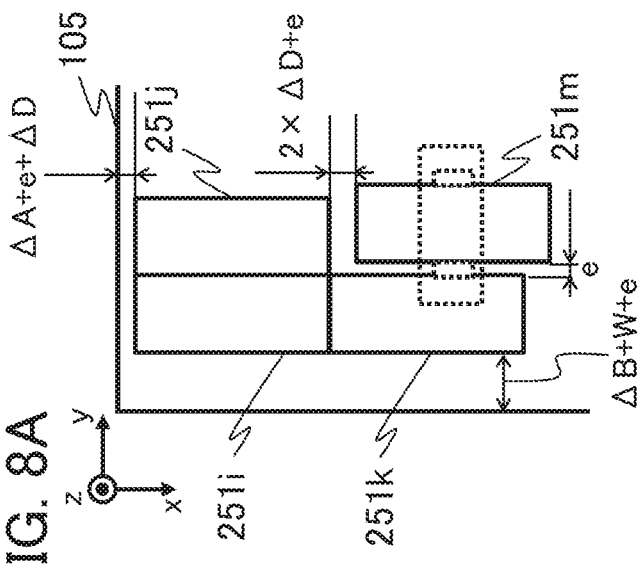
FIG. 8A is an explanatory diagram of an ideal installation position in the case where an article is additionally installed using the finger-type hand according to the embodiment of the present invention.
Figure 8B:
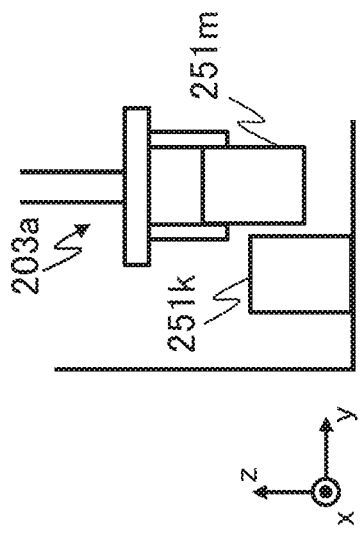
FIG. 8B is an explanatory diagram of an ideal installation position in the case where an article is additionally installed using the finger-type hand according to the embodiment of the present invention.

It should be noted that the robot 101 may move the article 251$m$ up to the position shown in each of FIG. 8C and FIG. 8D, and then may further move the same in they direction by only −(W+e). Accordingly, the article 251$k$ is moved by being pushed by the article 251$m$, and a distance between the article 251$k$ and the wall surface facing the side surface thereof on the long-side side is only ΔB. Even when the article 251$j$ is installed after the article 251$i$ is installed, the articles may be similarly moved. Accordingly, a distance between the wall surface and the article 251 becomes small, and further the use efficiency of the volume of the sorting box 105 is improved.

FIGS. 9A, 9B, 9C and 9D are explanatory diagrams of an actual installation position including the maximum error in the case where an article is additionally installed using the finger-type hand 203$a$ according to the embodiment of the present invention.

Figure 9A:
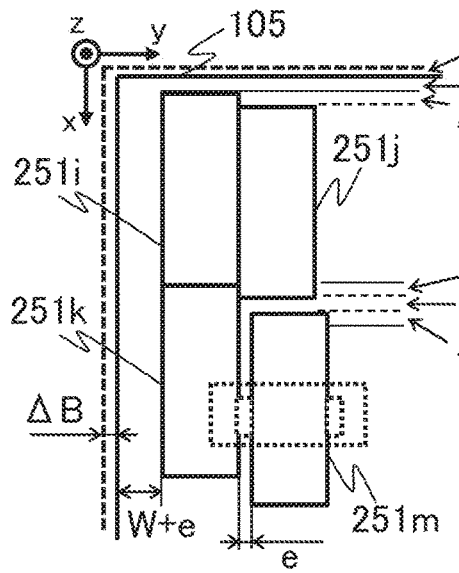
FIG. 9A is an explanatory diagram of an actual installation position including a maximum error in the case where an article is additionally installed using the finger-type hand according to the embodiment of the present invention.

In this example, it is assumed that an error occurs in recognition of the sorting box 105, and the actual position of the wall surface of the sorting box 105 shown by the solid line is shifted with respect to a recognition result shown by the dashed line by only +ΔA in the x direction and by only +ΔB in the y direction (see the plan view of FIG. 9A). Here, ΔA and ΔB are recognition maximum errors as shown in Equations (4) and (5).

Further, as shown in FIG. 9A, the articles 251$i$ and 251$k$ are placed at the ideal positions, but the article 251$i$ is placed at a position shifted from the ideal position in the x direction by only +ΔD.

Figure 9B:
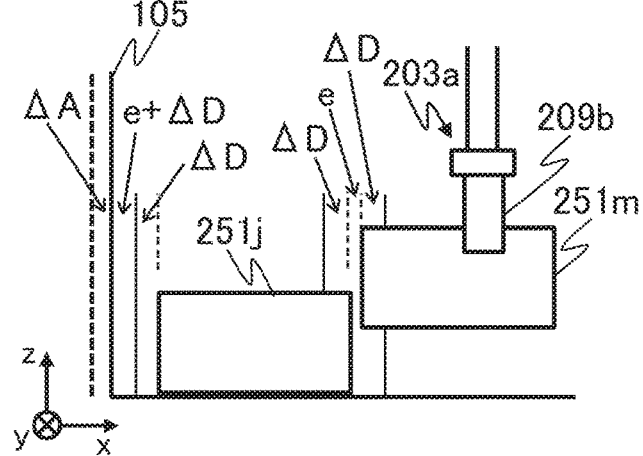
FIG. 9B is an explanatory diagram of an actual installation position including a maximum error in the case where an article is additionally installed using the finger-type hand according to the embodiment of the present invention.

On the other hand, the grip position of the article 251$m$ to be installed by the finger 209 is shifted from the deal position in the x direction by only +ΔD. Therefore, the position when the article 251$m$ is inserted into the sorting box 105 (namely, before the shift movement is carried out) is shifted from the ideal position in the x direction by only −ΔD. This state is shown in each of FIG. 9A and FIG. 9B. It should be noted that FIG. 9B is a side view for showing a positional relation among the wall surface, the article 251$j$, and the article 251$m$ shown in FIG. 9A.

However, as described above while referring to FIGS. 8A, 8B, 8C, 8D, 8E and 8F, the article 251$m$ is inserted into the position shifted in the x direction by only +(2×ΔD+e) from the position where the article 251$m$ is to be finally installed, and thus a space corresponding to the margin e is secured between the articles 251$j$ and 251$m$ even in the case where the above-described error is present. Accordingly, even in the case where the maximum error that can be assumed occurs, the article 251*m* can be inserted into the sorting box 105 without being damaged by contact with the article 251*j*.

Further, the robot 101 moves the article 251*m* in the x direction by −(2×ΔD+e) while gripping the same using the finger-type hand 203*a*. Then, the article 251*m* comes into contact with the article 251*j* when the article 251*m* is moved by only the margin −e. Further, when the robot 101 moves the article 251*m* so as to push the article 251*j*, both of the articles 251*j* and 251*m* are installed at positions shifted from the ideal positions in the x direction by only −ΔD when a movement of −(2×ΔD+e) is competed.

A distance between the ideal position of the article 251*j* and the wall surface (the dashed line of FIG. 9) on the basis of the recognition result of the sorting box 105 is originally ΔA+e+ΔD. Therefore, even when a recognition error of ΔA actually occurs, a space corresponding to the margin e is secured between the actual wall surface (the solid line of FIG. 9) and the article 251*j* (see FIG. 9C and FIG. 9D). Here, as described above while referring to FIG. 6, in the case where the article 251*j* is further moved in the x direction by only −e, the article 251*j* precisely comes into contact with the wall surface.

Next, storage of an article by the robot 101 having the suction hand 203*b* will be described with reference to FIG. 10 to FIG. 17.

FIGS. 10A, 10B, 10C and 10D are explanatory diagrams of gripping of an article by the suction hand 203*b* according to the embodiment of the present invention.

Figure 10A:
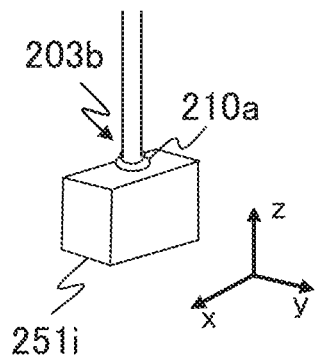
FIG. 10A is an explanatory diagram of gripping of an article by a suction hand according to the embodiment of the present invention.
Figure 10B:
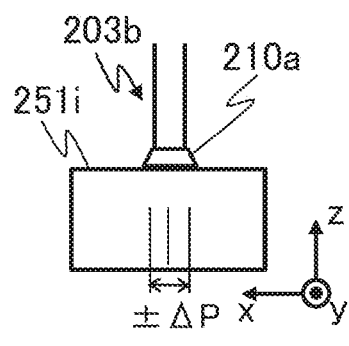
FIG. 10B is an explanatory diagram of gripping of an article by a suction hand according to the embodiment of the present invention.
Figure 10C:
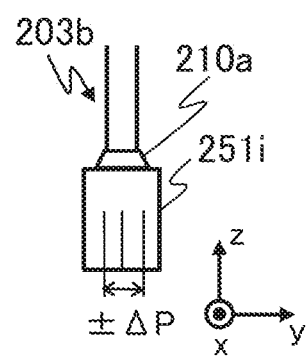
FIG. 10C is an explanatory diagram of gripping of an article by a suction hand according to the embodiment of the present invention.
Figure 10D:
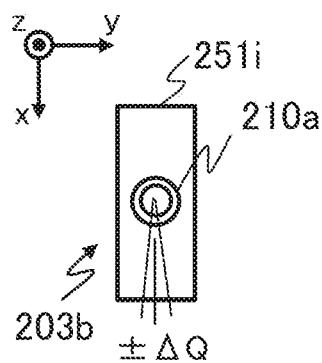
FIG. 10D is an explanatory diagram of gripping of an article by a suction hand according to the embodiment of the present invention.

FIG. 10A is a perspective view of the suction hand 203*b* gripping the article 251*i* while being sucked by the suction pad 210*a*. FIG. 10B is a side view obtained by viewing the suction hand 203*b* and the article 251*i* of FIG. 10A from the y direction (namely, the direction parallel to short sides of the article 251*i* in a horizontal surface). FIG. 10C is a side view obtained by viewing the suction hand 203*b* and the article 251*i* of FIG. 10A from the x direction (namely, the direction parallel to long sides of the article 251*i* in a horizontal surface). FIG. 10D is a plan view obtained by viewing the suction hand 203*b* and the article 251*i* of FIG. 10A from the z direction (namely, the upper direction).

In the case where the robot 101 grips the article 251*i* using the suction hand 203*b*, a vacuum pressure is measured by driving the arm 201 to move the suction pad 210*a* from the above of the article 251*i* to the lower direction. Then, when detecting the suction of the article 251*i* on the basis of the measured vacuum pressure, the arm 201 is immediately stopped. Accordingly, the article 251*i* can be correctly sucked even when an error occurs in recognition of the height of the article 251*i*. On the other hand, the article position recognition maximum error GP and the article posture recognition maximum error ΔΩ are the same as in the case of the finger-type hand 203*a*.

Figure 11:
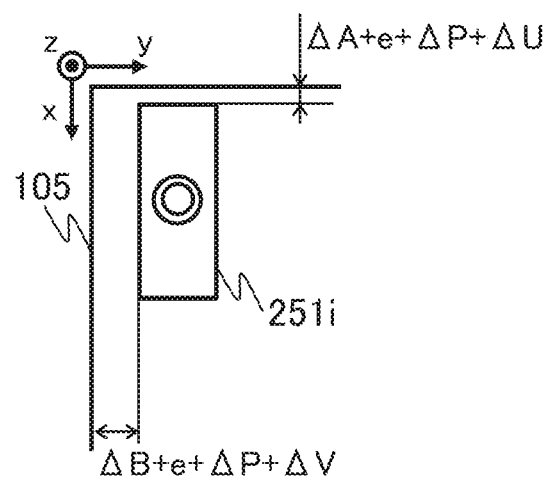
FIG. 11 is an explanatory diagram of the ideal installation position of an article that is initially stored into the sorting box by the suction hand according to the embodiment of the present invention.

FIG. 11 is an explanatory diagram of the ideal installation position of an article that is initially stored into the sorting box 105 by the suction hand 203*b* according to the embodiment of the present invention.

Specifically, FIG. 11 is a plan view for showing the ideal installation position of the article 251*i* in the sorting box 105 when the article 251*i* is initially stored using the suction hand 203*b* into the sorting box 105 in which no article is stored yet. The ideal installation position is a position where a distance between a short side of the article 251*i* and a wall surface of the sorting box 105 parallel to the short side is ΔA+e+ΔP+ΔU and a distance between a long side of the article 251*i* and a wall surface of the sorting box 105 parallel to the long side is ΔB+e+ΔP+ΔV.

Here, ΔA represents the maximum error of the installation position of the article 251*i* in the x direction caused by the recognition error of the sorting box 105, ΔB represents the maximum error of the installation position of the article 251*i* in the y direction caused by the recognition error of the sorting box 105, ΔU represents the maximum error of the article installation position in the x direction due to the article posture recognition error, ΔV represents the maximum error of the article installation position in the y direction due to the article posture recognition error, and "e" represents a margin.

ΔA and ΔB are calculated by Equation (4) and Equation (5), respectively. It should be noted that the length a of the sorting box 105 is the length of the sorting box 105 in the x direction, and the width b of the sorting box 105 is the length of the sorting box 105 in the y direction.

On the other hand, ΔU and ΔV are calculated by Equation (11) and Equation (12), respectively.

$$\Delta U = u/2 \times (\cos \Delta\Omega - 1) + v/2 \times \sin \Delta\Omega \quad (11)$$

$$\Delta V = v/2 \times (\cos \Delta\Omega - 1) + u/2 \times \sin \Delta\Omega \quad (12)$$

Here, "u" represents the length (the x direction, the long side) of the article 251*i*, and the "v" represents the width (the y direction, the short side) of the article 251*i*.

It should be noted that ΔA and ΔB are calculated in the case where the position of the sorting box 105 is recognized using the sorting box recognition sensor 205. As similar to the case of FIG. 6, in the case where the positional error of the sorting box 105 is negligibly small, ΔA and ΔB can be 0.

In addition, when the suction hand 203*b* grips the article 251*i* to be inserted into the sorting box 105 from an opening portion at an upper end of the sorting box 105 and moves the same to near the bottom surface of the sorting box 105, it is necessary to provide the margin e in each of the x direction and the y direction. However, the suction hand 203*b* may thereafter move the article 251*i* in the −x direction and the −y direction by only the margin e to shorten a distance between the article 251*i* and the wall surface, and then may install the same on the bottom surface.

In this case, it is necessary to secure a distance of ΔA+e+ΔP+ΔU between a wall surface parallel to the y direction and the article 251*i*. However, the article 251*i* may be thereafter moved in the −x direction by only the margin e (namely, the article 251*i* is brought closer to the wall surface direction by only the margin e) to be installed the bottom surface. In this case, a distance between a short side of the article 251*i* and a wall surface of the sorting box 105 parallel to the short side is ΔA+ΔP+ΔU. Likewise, it is necessary to secure a distance of ΔB+e+ΔP+ΔV between a wall surface parallel to the x direction and the article 251*i*. Thereafter, when the article 251*i* is moved in the −y direction by only the margin e, a distance between a long side of the article 251*i* and a wall surface of the sorting box 105 parallel to the long side is ΔB+ΔP+ΔV.

Figure 12:
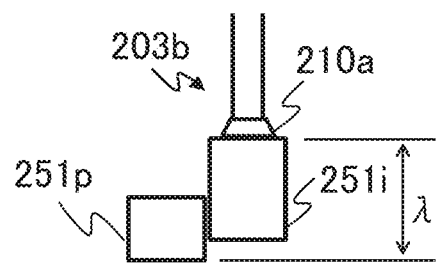
FIG. 12 is an explanatory diagram of the height of the tip end of a suction pad at the time of shift movement of an article by the suction hand according to the embodiment of the present invention.

FIG. 12 is an explanatory diagram of the height of the tip end of the suction pad 210*a* at the time of shift movement of an article by the suction hand 203*b* according to the embodiment of the present invention.

Specifically, FIG. 12 explains the height from the bottom surface of the sorting box 105 to the tip end of the suction pad 210*a* in such a case that when the article 251*i* is stored using the suction hand 203*b* into the sorting box 105 in which the article 251*p* is already stored, the article 251*i* is horizontally moved to the direction of the article 251*p* after the article 251*i* is moved from an opening portion of the sorting box 105 to near the bottom surface. The movement in the horizontal direction is also described as shift movement. It should be noted that the sorting box 105 is not illustrated in FIG. 12 for convenience of explanation.

When pushing around an upper surface of the article 251p at the time of shift movement of the article 251i, the article 251p falls without being slid on the floor surface in some cases. Therefore, the article 251i is desirably shifted and moved at a position as low as possible. Based on this, the height (namely, the distance from the bottom surface of the sorting box 105) λ of the tip end of the suction pad 210a at the time of shift movement of the article 251i is calculated by Equation (13).

$$\lambda = H + e \qquad (13)$$

Here, λ represents the height of the tip end of the suction pad 210a at the time of shift movement of the article 251i, and H represents the height of the article 251i.

Accordingly, the height of the suction hand 203b can be controlled so that the height of the bottom surface of the article 251i is higher than the height of the bottom surface of the article 251p and the height of the bottom surface of the article 251i is lower than the height of the upper surface of the article 251p. Further, the shift movement of the article 251i at a lower position can be realized.

FIGS. 13A, 13B, 13C, 13D, 13E and 13F are explanatory diagrams of an ideal installation position in the case where an article is additionally installed using the suction hand 203b according to the embodiment of the present invention.

In the example, the article 251m is newly stored in a state where the articles 251i, 251j, and 251k are already stored as similar to the example of FIGS. 8A, 8B, 8C, 8D, 8E and 8F.

Figure 13C:
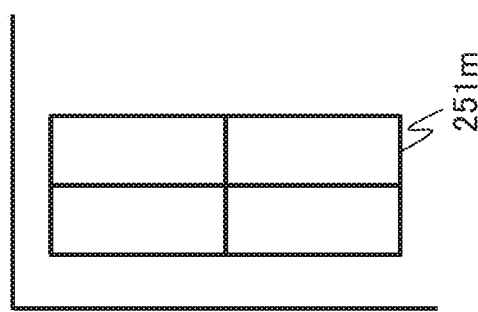
FIG. 13C is an explanatory diagram of an ideal installation position in the case where an article is additionally installed using the suction hand according to the embodiment of the present invention.
Figure 13B:
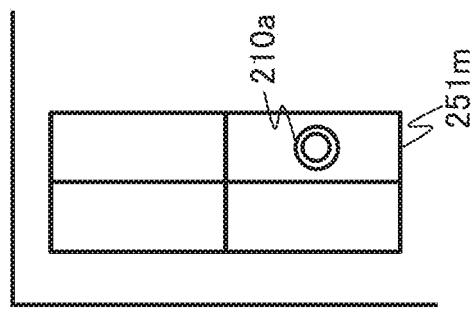
FIG. 13B is an explanatory diagram of an ideal installation Position in the case where an article is additionally installed using the suction hand according to the embodiment of the present invention.
Figure 13A:
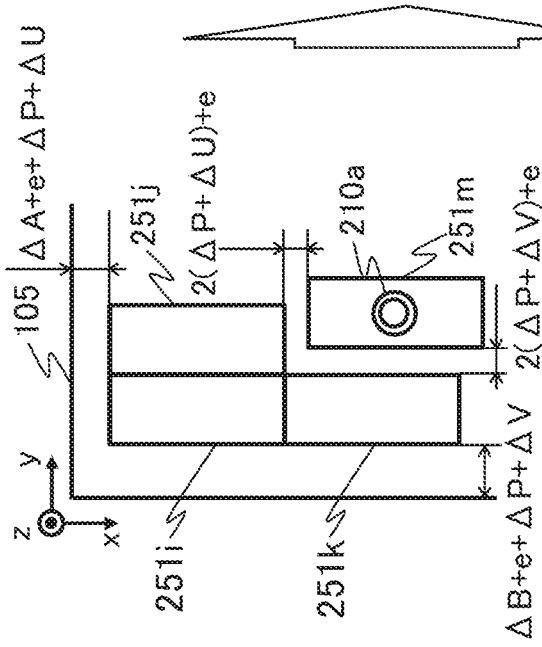
FIG. 13A is an explanatory diagram of an ideal installation position in the case where an article is additionally installed using the suction hand according to the embodiment of the present invention.

The robot 101 inserts the article 251m using the suction hand 203b into a position apart from the side surface of the article 251j adjacent to the x direction by only 2 (ΔP+ΔU)+e and apart from the side surface of the article 251k adjacent to the y direction by only 2 (ΔP+ΔV)+e. A plan view of the arrangement of each article 251 at this time is shown in FIG. 13A, and a side view viewed from the x direction is shown in FIG. 13B. As shown in FIG. 13B, the article 251m is still gripped by the suction hand 203b at this time, and does not come into contact with the bottom surface of the sorting box 105.

Figure 13F:
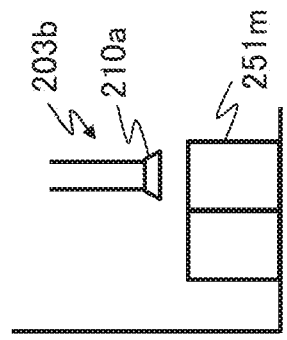
FIG. 13F is an explanatory diagram of an ideal installation position in the case where an article is additionally installed using the suction hand according to the embodiment of the present invention.
Figure 13E:
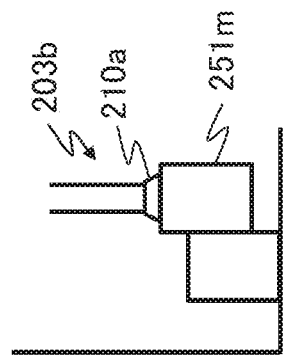
FIG. 13E is an explanatory diagram of an ideal installation position in the case where an article is additionally installed using the suction hand according to the embodiment of the present invention.
Figure 13D:
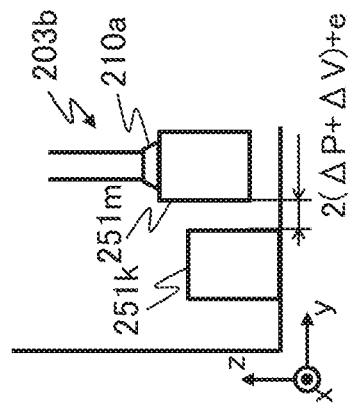
FIG. 13D is an explanatory diagram of an ideal installation position in the case where an article is additionally installed using the suction hand according to the embodiment of the present invention.

Thereafter, the robot 101 moves the article 251m in the −x direction by only 2 (ΔP+ΔU)+e and in the −y direction by only 2 (ΔP+ΔV)+e. Accordingly, the side surface of the article 251m on the short-side side comes into contact with the article 251j, and the side surface thereof on the long-side side comes into contact with the article 251k. A plan view of the arrangement of each article 251 at this time is shown in FIG. 13C, and a side view viewed from the x direction is shown in FIG. 13D.

When the suction pad 210a releases the article 251m thereafter, the article 251m comes into contact with the bottom surface of the sorting box 105. A plan view of the arrangement of each article 251 at this time is shown in FIG. 13E, and a side view viewed from the x direction is shown in FIG. 13F.

Figure 14:
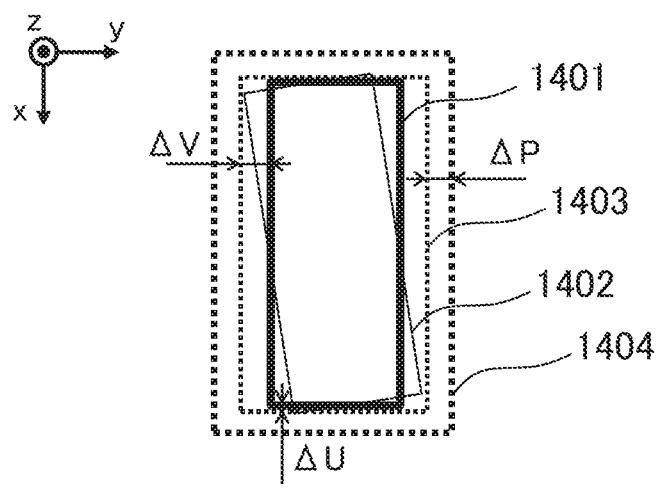
FIG. 14 is an explanatory diagram of a relation between the ideal position of an article and an assumed region in consideration of the maximum error in the case where the suction hand according to the embodiment of the present invention is used.

FIG. 14 is an explanatory diagram of a relation between the ideal position of an article and an assumed region in consideration of the maximum error in the case where the suction hand 203b according to the embodiment of the present invention is used.

Specifically, FIG. 14 is a plan view for showing the installation position of the article 251 and a region where the article 251 is possibly installed. A frame 1401 of the thick solid line shows the ideal position of the article 251. The range of the frame is also described as the region of the ideal position. A frame 1402 of the thin solid line shows an example of the position of the article 251 in the case where the positional error is zero and the postural error is maximum.

A frame 1403 of the thin dotted line shows the assumed region where the article 251 is actually installed in consideration of the postural maximum error and without consideration of the positional error (namely, the positional error is zero). In the case where the postural error is a value from zero to the maximum value and the positional error is zero, the article 251 possibly exists at any position in the frame 1403 of the thin dotted line, but does not exist on the outside thereof.

A frame 1404 of the thick dotted line shows the assumed region where the article 251 is actually installed in consideration of the postural maximum error and the positional maximum error. In the case where each of the postural error and the positional error is a value from zero to the maximum value, the article 251 possibly exists at any position in the frame 1404 of the thick dotted line, but does not exist on the outside thereof.

Figure 15C:
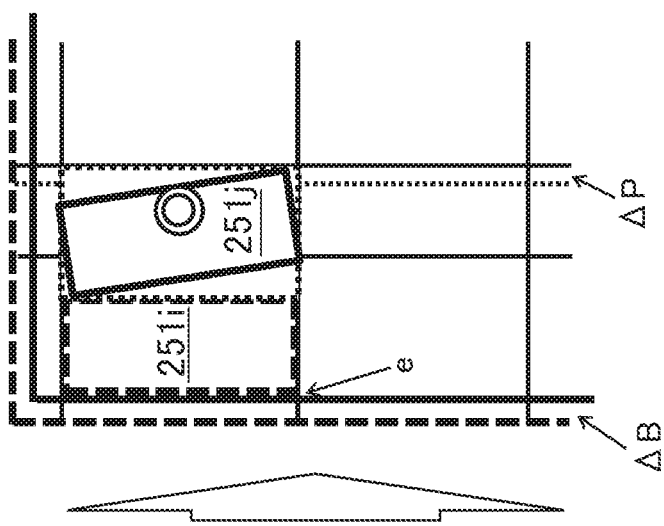
FIG. 15C is a first explanatory diagram of an actual installation position including the maximum error in the y direction in the case where an article is additionally installed using the suction hand according to the embodiment of the present invention.
Figure 15B:
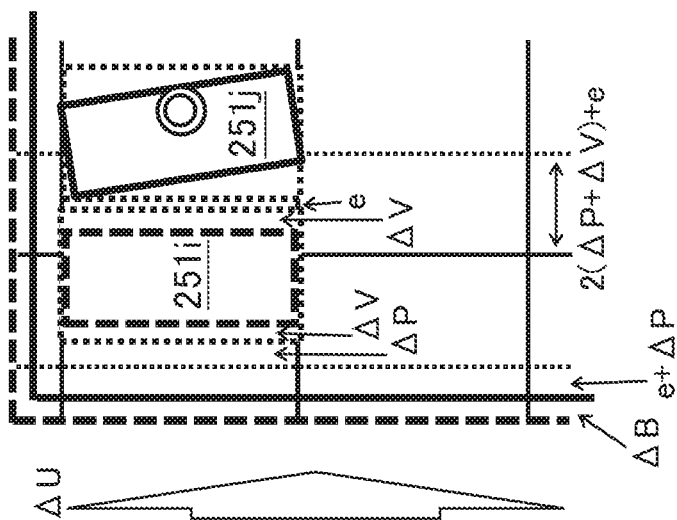
FIG. 15B is a first explanatory diagram of an actual installation position including the maximum error in the y direction in the case where an article is additionally installed using the suction hand according to the embodiment of the present invention.
Figure 15A:
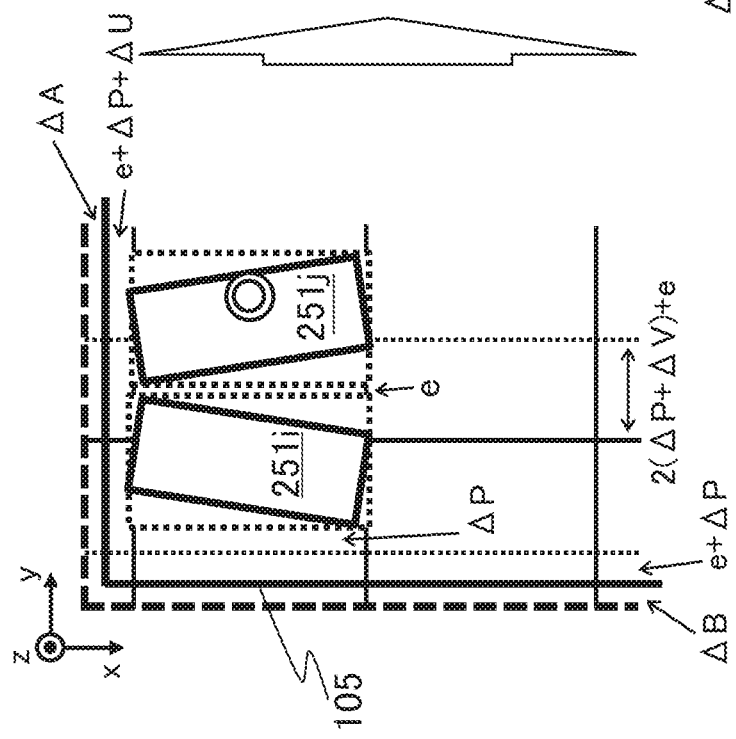
FIG. 15A is a first explanatory diagram of an actual installation position including the maximum error in the y direction in the case where an article is additionally installed using the suction hand according to the embodiment of the present invention.

FIGS. 15A, 15B and 15C are first explanatory diagrams of an actual installation position including the maximum error in the y direction in the case where an article is additionally installed using the suction hand 203b according to the embodiment of the present invention.

In this example, as similar to the example of FIGS. 9A, 9B, 9C and 9D, it is assumed that an error occurs in recognition of the sorting box 105, and the actual positions of the wall surfaces of the sorting box 105 shown by the thick solid line are shifted with respect to a recognition result shown by the thick dashed line by only +ΔA in the x direction and by only +ΔB in the y direction.

As shown in FIG. 15A, the article 251i is already stored in the sorting box 105. In the case of the article 251i, the postural error is maximum, and the positional error in the +y direction is maximum. Therefore, the article 251i is installed in such a manner that an end in the +y direction is shifted from the ideal position to the +y direction by only ΔP+ΔV.

On the other hand, in the case of the article 251j, the postural error is maximum, and the positional error in the −y direction is maximum. Namely, the suction position (the position of the double circle in each of FIGS. 15A, 15B and 15C) by the suction pad 210a is shifted from the ideal position to the y direction by only +ΔP. Therefore, the insertion position of the article 251j to the sorting box 105 is positioned in such a manner that an end in the −y direction is shifted from the ideal position to the −y direction by only ΔP+ΔV. Namely, the article 251j is inserted into a position where a distance between the article 251j and the actual position of the article 251i is minimized.

At this time, however, the article 251j is inserted so that a space of 2 (ΔP+ΔV)+e is secured between the region of the ideal position of the article 251j and the region of the ideal position of the article 251i is secured. Namely, each of the assumed regions where the postural maximum errors and the positional maximum errors of the article 251i and the article 251j are considered is separated in the y direction by only the margin e. Therefore, even when the above-described error is present, the contact of the article 251j with the article 251i is avoided.

The postural error can be virtually regarded as zero by assuming that the posture of the article 251i is modified by being sandwiched between the wall surface of the sorting box 105 and the article 251j (FIG. 15B). Then, a margin of ΔV is created on each side surface in the y direction of the article 251*i* whose postural error is virtually zero.

Thereafter, the robot 101 moves the suction hand 203*b* to move the article 251*j* in the −y direction by only 2 (ΔP+ΔV)+e. As a result, the article 251*i* is pushed by the article 251*j* to be moved in the −y direction. Finally, a space corresponding to the margin e remains between the article 251*i* and the wall surface parallel to the x direction (FIG. 15C). As a result, the article 251*i* is not crushed.

On the other hand, as shown in FIG. 15C, the positional error of the article 251*j* is ΔP in the −y direction with respect to the ideal position. Since the postural error is additionally present, the actual article 251*j* occupies a region larger than that occupied by the article 251*j* at the ideal position by only 2×ΔV in the y direction.

FIGS. 16A, 16B and 16C are second explanatory diagrams of an actual installation position including the maximum error in the y direction in the case where an article is additionally installed using the suction hand 203*b* according to the embodiment of the present invention.

Specifically, FIGS. 16A, 16B and 16C show states continued from FIGS. 15A, 15B and 15C. Namely, FIG. 16A shows a state in which after the articles 251*i* and 251*j* are installed as shown in FIG. 15C, an article 251*n* is newly inserted into a position adjacent to the article 251*j* on the +y side.

In the example, the article 251*n* has the maximum postural error in the direction opposite to the article 251*j*, and further the suction position by the suction pad 210*a* is shifted from the ideal position by only +ΔP in the y direction. As a result, the actual position of the article 251*n* is located closest to the article 251*j* in the assumed error range.

At this time, however, the article 251*n* is inserted so that a space of 2 (ΔP+ΔV)+e is secured between the region of the ideal position of the article 251*n* and the region of the ideal position of the article 251*j*. Namely, each of the assumed regions where the postural maximum errors and the positional maximum errors of the article 251*j* and the article 251*n* are considered is separated in the y direction by the only e+ΔP. Therefore, even when the above-described error is present, the contact of the article 251*n* with the article 251*j* is avoided.

The postural error can be virtually regarded as zero by assuming that the posture of the article 251*j* is modified by being sandwiched between the article 251*i* and the article 251*n*. The position is located apart from the ideal position in the y direction by −ΔP (FIG. 16B).

Thereafter, the robot 101 moves the suction hand 203*b* to move the article 251*n* in the −y direction by only 2 (ΔP+ΔV)+e. As a result, the article 251*j* is pushed by the article 251*n*, and the postural error thereof is modified. Finally, the article 251*j* and the article 251*i* precisely come into contact with each other, and both of the article 251*j* and the article 251*i* are not crushed (FIG. 16C).

On the other hand, as shown in FIG. 16C, the positional error of the article 251*n* is ΔP in the −y direction with respect to the ideal position. Since the postural error is additionally present, the actual article 251*n* occupies a region larger than that occupied by the article 251*n* at the ideal position by only 2×ΔV in the y direction.

FIG. 15 and FIG. 16 explain operations of reducing the extra space in the y direction and modifying the posture of the article adjacent in the y direction by moving the newly-inserted article 251 in the y direction. By carrying out the similar operations in the x direction, the extra space between the newly-inserted article 251 and the article 251 adjacent thereto in the x direction can be reduced and the posture of the adjacent article 251 can be modified. In addition, the operations in the x direction and the operations in the y direction can be simultaneously carried out. The operations will be described with reference to FIGS. 17A and 17B.

FIGS. 17A and 17B are explanatory diagrams of an actual installation position including the maximum error in the case where an article is additionally installed using the suction hand 203*b* according to the embodiment of the present invention.

In this example, as similar to the examples of FIG. 9, FIG. 15, and FIG. 16, it is assumed that an error occurs in recognition of the sorting box 105, and the actual positions of the wall surfaces of the sorting box 105 shown by the thick solid line are shifted with respect to a recognition result shown by the thick dashed line by only +ΔA in the x direction and by only +ΔB in the y direction.

In addition, both of the article 251*j* installed adjacent to the article 251*i* in the +y direction and the article 251*k* installed adjacent to the article 251*i* in the +x direction have the maximum postural errors and the maximum positional errors in the example. As a result, each of the article 251*j* and the article 251*k* is installed in such a manner that an end in the +x direction is shifted from the ideal position in the +x direction by only ΔP+ΔU and an end in the +y direction is shifted from the ideal position in the +y direction by only ΔP+ΔV.

On the other hand, the article 251*m* that is adjacent to the article 251*j* in the x direction and is newly inserted into a target position adjacent to the article 251*k* in they direction has the maximum postural error in the direction opposite to the article 251*j* and the article 251*k*. Further, the grip position of the article 251*m* by the suction pad 210*a* is shifted from the ideal position in the x direction and the y direction by only +ΔP.

Therefore, the position of the article 251*m* to be inserted is shifted from the ideal position in the x direction and the y direction by only −ΔP. Namely, the actual position into which the article 251*m* is inserted is located closest to the article 251*j* and the article 251*k* in the assumed error range.

At this time, however, the article 251*m* is inserted so that a space of 2 (ΔP+ΔU)+e is secured between the region of the ideal position of the article 251*m* and the region of the ideal position of the article 251*j* and a space of 2 (ΔP+ΔV)+e is secured between the region of the ideal position of the article 251*m* and the region of the ideal position of the article 251*k*. Namely, each of the assumed regions where the postural maximum errors and the positional maximum errors of the article 251*m* and the article 251*j* are considered is separated in the x direction and the y direction by only the margin e. Therefore, even when the above-described error is present, the contact of the article 251*m* with the article 251*j* and the article 251*k* is avoided (FIG. 17A).

Thereafter, the robot 101 moves the suction hand 203*b* to move the article 251*m* in the −x direction by only 2 (ΔP+ΔU)+e. Then, the posture maximum error assumed regions (the thick dotted lines of FIG. 17A) of the article 251*j* and the article 251*m* come into contact with each other when the article 251*m* is moved by only the margin e.

Further, when the article 251*m* is moved in the −x direction by only 2 (ΔP+ΔU) together with the article 251*j*, each of the article 251*j* and the article 251*m* is installed at a position shifted from the ideal position by only ΔP in the −x direction. At this time, if the article 251*j* is sandwiched between the wall surface of the sorting box 105 and the article 251*m*, the postural error of the article 251*j* is accordingly modified (the article 251*j* of FIG. 17B).

Finally, a space corresponding to the margin e remains between the article 251j whose positional error is zero and the wall surface of the sorting box 105.

Likewise, the robot 101 moves the suction hand 203b to move the article 251m in the −y direction by only 2 (ΔP+ΔV)+e. Then, the posture maximum error assumed regions (the thick dotted lines of FIG. 17A) of the article 251k and the article 251m come into contact with each other when the article 251m is moved by only the margin e.

Further, when the article 251m is moved in the −y direction by only 2 (ΔP+ΔV) together with the article 251k, each of the article 251k and the article 251m is installed at a position shifted from the ideal position by only ΔP in the −y direction. At this time, if the article 251k is sandwiched between the wall surface of the sorting box 105 and the article 251m, the postural error of the article 251k is accordingly modified (the article 251k of FIG. 17B).

Finally, a space corresponding to the margin e remains between the article 251j whose positional error is zero and the wall surface of the sorting box 105.

Next, storage of an article by the robot 101 having the double suction hand 203c will be described with reference to FIGS. 18A, 18B, 18C, 18D, 18E and 18F.

FIGS. 18A, 18B, 18C, 18D, 18E and 18F are explanatory diagrams of gripping of an article by the double suction hand 203c according to the embodiment of the present invention.

Figure 18A:
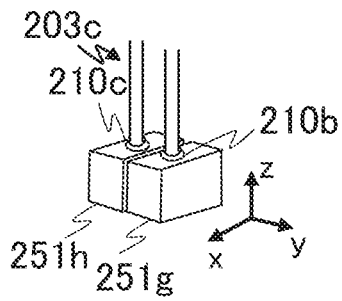
FIG. 18A is an explanatory diagram of gripping of an article by a double suction hand according to the embodiment of the present invention.

FIG. 18A is a perspective view of the double suction hand 203c gripping articles 251g and 251h while being sucked by the suction pads 210b and 210c, respectively.

Figure 18B:
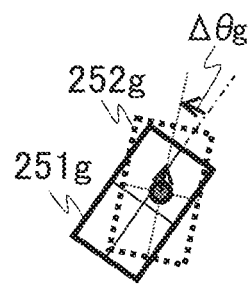
FIG. 18B is an explanatory diagram of gripping of an article by a double suction hand according to the embodiment of the present invention.
Figure 18C:
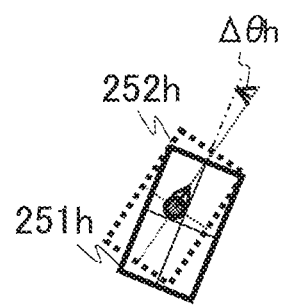
FIG. 18C is an explanatory diagram of gripping of an article by a double suction hand according to the embodiment of the present invention.

FIG. 18B is a plan view for showing an example of a relation among the suction pad 210b, the article 251g, and a recognition result 252g of the article 251g. FIG. 18C is a plan view for showing an example of a relation among the suction pad 210c, the article 251h, and a recognition result 252h of the article 251h. As similar to the case of the suction hand 203b shown in FIGS. 4A and 4B, even in the case where the double suction hand 203c is used, the positional errors Δx and Δy and the postural error Δθ occur. In FIGS. 18A, 18B, 18C, 18D, 18E and 18F, the postural error of the article 251g is described as Δθg, and the postural error of the article 251h is described as Δθh.

Figure 18D:
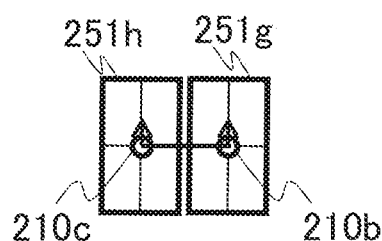
FIG. 18D is an explanatory diagram of gripping of an article by a double suction hand according to the embodiment of the present invention.

FIG. 18D is a plan view of the articles 251g and 251h gripped by the suction pads 210b and 210c, respectively, at the ideal positions with the ideal postures (namely, in a state where neither positional errors nor postural errors occur). In this example, the centers of the articles 251g and 251h are sucked and gripped by the suction pads 210b and 210c, respectively, and these postures match those recognized by the robot 101.

Figure 18E:
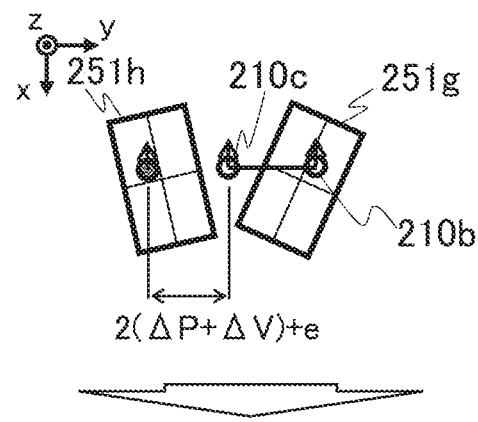
FIG. 18E is an explanatory diagram of gripping of an article by a double suction hand according to the embodiment of the present invention.
Figure 18F:
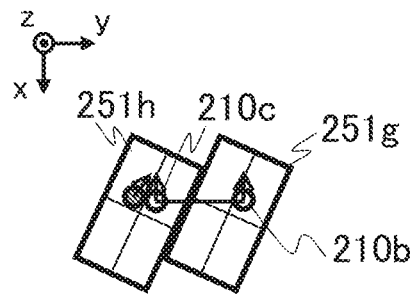
FIG. 18F is an explanatory diagram of gripping of an article by a double suction hand according to the embodiment of the present invention.

FIG. 18E and FIG. 18F are plan views each explaining procedures of gripping two articles 251g and 251h using the double suction hand 203c. In the initial state, the double suction hand 203c grips no articles, and each of the articles 251g and 251h is placed at an arbitrary position in the storage box 103.

First, the robot 101 sucks and grips the article 251g using the suction pad 210b. At this time, as shown in FIG. 18B, there are errors in the actual suction position and posture of the article 251g with respect to the ideal position and the ideal posture. Thereafter, the robot 101 brings the double suction hand 203c close to the article 251h.

At this time, the robot 101 matches the suction pad 210c with the suction position (for example, the center of the recognition result 252h) of the recognition result 252h of the article 251h, but further moves the suction pad 210c in the −y direction by only 2 (ΔP+ΔV)+e. As a result, the article 251h is pushed by the article 251g in the −y direction, and the posture thereof becomes substantially the same as that of the article 251g (FIG. 18E). "Substantially the same" does not mean "exactly the same", and is a concept including a state in which the surfaces of the sucked articles 251g and 251h facing each other come into contact with each other or follow each other.

In such a state, the robot 101 lowers the double suction hand 203c so that the tip end of the suction pad 210c has a height equal to that of the upper surface of the article 251h, and sucks and grips the article 251h.

To summarize, the descriptions of the suction pads 210b and 210c are modified examples of second and third processes executed after a process (first process) of arranging a first article in the sorting box 105 is executed.

As the second process, the robot 101 takes out the article 251g and the article 251h from the storage box 103, and moves the same to near the first article in the sorting box 105. First, the robot 101 sucks the upper surface of the article 251g in the storage box 103 using a first suction pad 210b. Next, by moving the robot 101, the article 251g is placed adjacent to the article 251h while providing a space. By moving the robot 101 from there so that the article 251g comes close to the article 251h, the surfaces of the article 251g and the article 251h facing each other come into contact with each other. By further moving the robot 101 after the contact, the article 251a changes the posture of the article 251h. At this time, the postures of the articles 251g and 251h become substantially the same.

Next, when a second suction pad 210c sucks the upper surface of the article 251c, the article 251g and the article 251h are sucked by the first suction pad 210b and the second suction pad 210c, respectively, in a state of substantially the same postures. Even in the case where the robot 101 moves in this state, the two articles 251g and 251h can be conveyed while keeping substantially the same postures. If the two articles 251g and 251h are stored into the sorting box 105 in this state, a gap between these articles is eliminated, and the housing efficiency in the sorting box 105 can be improved. After the suction by the second suction pad 210c, the robot 101 moves the two articles 251g and 251h to near the first article in the sorting box 105.

As the third process, the robot 101 comes close to the first article in the sorting box 105 while gripping the two articles 251g and 251h, and changes the postures and positions of the other articles after the articles come into contact with each other. Thereafter, the robot 101 that has moved the other articles to predetermined positions or has changed the same into predetermined postures arranges the two articles 251g and 251h on the bottom surface of the sorting box 105 by releasing the two suction pads 210b and 210c, and the two articles can be stored into the box. Accordingly, a gap between the first article already arranged in the sorting box 105 and the article 251g or the article 251h can be reduced. It should be noted that the number of first articles may be two or more.

In addition, as the order in which the suction by the suction pads is released, it is preferable that the article in contact with the first article is released first, and then the article not in contact with the first article is released. In this case, since the article sandwiched between the first article and the article not in contact with the first article is arranged first, the posture is hardly deviated. Accordingly, a gap between the articles can further reduced, and thus the housing efficiency in the box can be improved.

An example of a case in which the article has been stored in the sorting box 105 has been described above. However, the embodiment can be carried out even in a state where no article has been stored in the sorting box 105. Namely, the embodiment can be carried out from the second process. In this case, since a distance (space) between the articles 251*g* and 251*h* can be reduced, two articles can be stored in the sorting box 105 with space saving, and the housing efficiency in the box can be improved.

In addition, even in the case where only the second process is carried out, a distance between the articles 251*g* and 251*h* can be reduced, and thus the efficiency of conveying the article by the robot 101 can be improved. In the state where a distance between articles is reduced, the articles can be stored in the sorting box 105. Thus, the embodiment can also contribute to improvement in the housing efficiency in the sorting box 105.

Next, a configuration of a system for realizing the storage of the articles as described above will be described with reference to FIG. 19 to FIG. 32.

Figure 19:
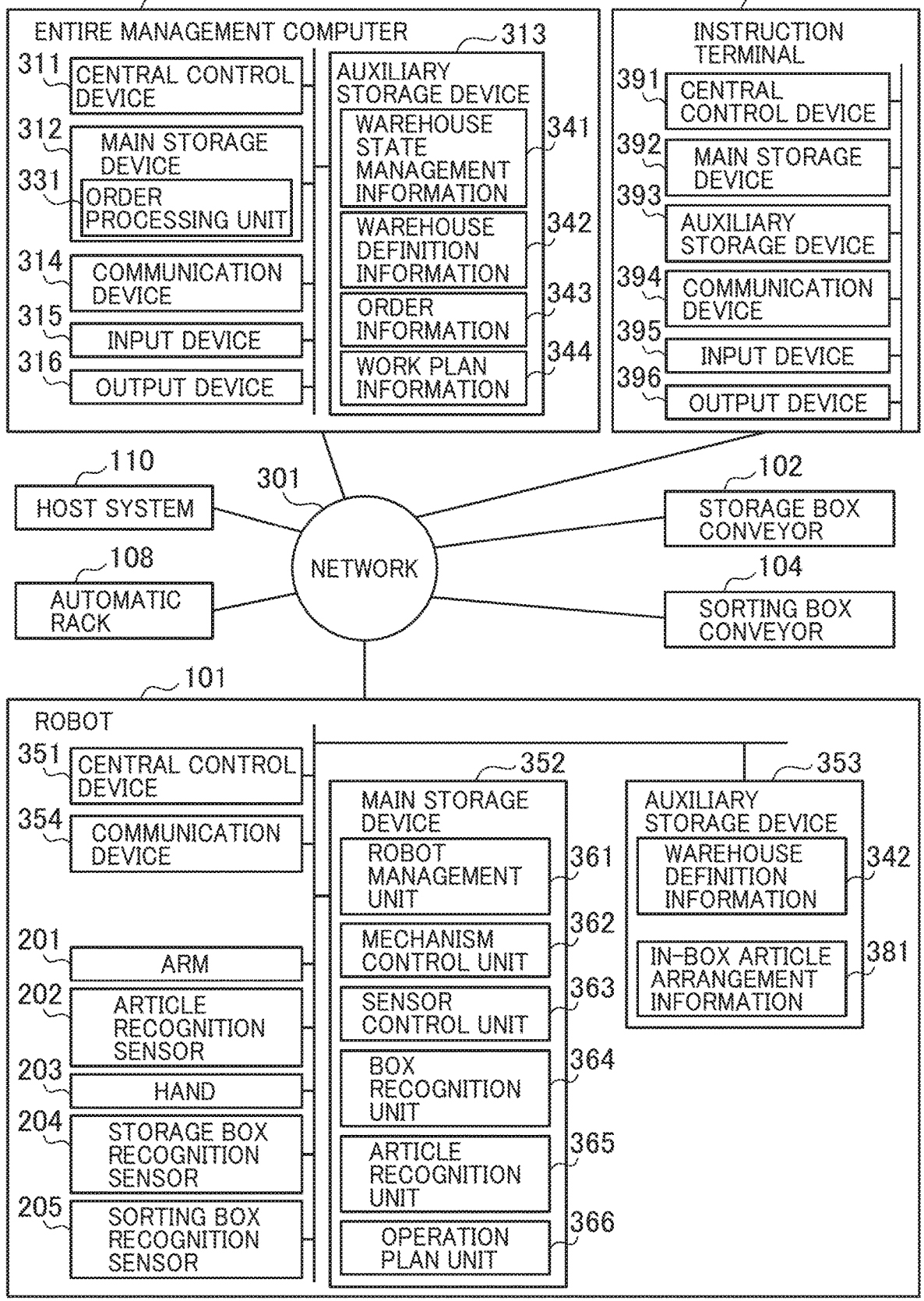
FIG. 19 is an explanatory diagram of a hardware configuration of the robot system according to the embodiment of the present invention.

FIG. 19 is an explanatory diagram of a hardware configuration of the robot system according to the embodiment of the present invention.

The entire management computer 109, the host system 110, the instruction terminal 107, the storage box conveyor 102, the sorting box conveyor 104, the automatic rack 108, and the robot 101 are connected to each other via a network 301. The network 301 may be a wired network, a wireless network, or a combination thereof as long as data communications can be performed via the network 301.

The entire management computer 109 is a computer having a central control device 311, a main storage device 312, a communication device 314, an input device 315, an output device 316, and an auxiliary storage device 313.

The central control device 311 is a processor that executes various processes by executing programs stored in the main storage device 312. The input device 315 is a device that accepts an input of information from a user of the entire management computer 109, and may be, for example, a keyboard, a mouse, or the like. The output device 316 is a device that outputs information to a user of the entire management computer 109, and may be, for example, a display device displaying characters, images, or the like. The communication device 314 is a device that communicates with each equipment, via the network 301, such as the host system 110 and the robot 101 connected to the network 301.

The main storage device 312 is, for example, a storage device such as a DRAM (Dynamic Random Access Memory), and holds a program and the like executed by the central control device 311. The main storage device 312 shown in FIG. 19 holds an order processing unit 331. This is a program executed by the central control device 311. Thus, a process executed by the order processing unit 331 in the following description is actually executed by the central control device 311 in accordance with the program held by the main storage device 312. The process executed in accordance with the program will be described later in detail.

The auxiliary storage device 313 is, for example, a storage device such as a hard disk drive or a flash memory, and holds information and the like necessary for a process executed by the central control device 311. The auxiliary storage device 313 shown in FIG. 19 holds warehouse state management information 341, warehouse definition information 342, order information 343, and work plan information 344. These pieces of information will be described later in detail (see FIG. 20 to FIG. 28). It should be noted that at least a part of these pieces of information may be copied to the main storage device 312 if needed, and may be referred to by the central control device 311. In addition, programs executed by the central control device 311 may be stored in the auxiliary storage device 313, and at least a part of the programs may be copied to the main storage device 312 if needed.

The instruction terminal 107 is a computer having a central control device 391, a main storage device 392, an auxiliary storage device 393, a communication device 394, an input device 395, and an output device 396 that are mutually connected to each other.

The central control device 391 is a processor that executes various processes by executing a program (not shown) stored in the main storage device 392. The input device 395 is a device that accepts an input of information from the worker 106, and may be, for example, a keyboard, a mouse, a touch sensor, or the like. The output device 396 is a device that outputs information to the worker 106, and may be, for example, a display device displaying characters, images, or the like. The input device 395 and the output device 396 may be integrated such as, for example, a so-called touch panel. The communication device 394 is a device that communicates with the entire management computer 109 via the network 301.

The main storage device 392 is, for example, a storage device such as a DRAM, and holds a program and the like executed by the central control device 391. The auxiliary storage device 393 is, for example, a storage device such as a hard disk drive or a flash memory, and holds information and the like necessary for a process executed by the central control device 391.

The host system 110 is a computer that receives an order from each delivery destination (for example, a store or the like that receives and sells articles stored in the warehouse), and generates order information to be transmitted to the entire management computer 109. A hardware configuration of the host system 110 may be the same as that of the entire management computer 109, and thus the illustration and explanation thereof will be omitted.

The robot 101 has a central control device 351, a main storage device 352, an auxiliary storage device 353, and a communication device 354, in addition to the arm 201, the article recognition sensor 202, the hand 203, the storage box recognition sensor 204, and the sorting box recognition sensor 205.

The central control device 351 is a processor that executes various processes by executing a program stored in the main storage device 352. The communication device 354 is a device that communicates with each equipment, via the network 301, such as the entire management computer 109 connected to the network 301.

The main storage device 352 is, for example, a storage device such as a DRAM, and holds a program and the like executed by the central control device 351. The main storage device 352 shown in FIG. 19 holds a robot management unit 361, a mechanism control unit 362, a sensor control unit 363, a box recognition unit 364, an article recognition unit 365, and an operation plan unit 366. These are programs executed by the central control device 311. Thus, processes executed by the above-described units in the following description are actually executed by the central control device 311 controlling the arm 201, the article recognition sensor 202, the hand 203, the storage box recognition sensor 204, and the sorting box recognition sensor 205 if needed in accordance with the programs held by the main storage device 312.

The auxiliary storage device 353 is, for example, a storage device such as a hard disk drive or a flash memory, and holds information and the like necessary for a process executed by the central control device 351. The auxiliary storage device 353 shown in FIG. 19 holds the warehouse definition information 342 and in-box article arrangement information 381. The warehouse definition information 342 is the same as that held by the entire management computer 109. The in-box article arrangement information 381 will be described later in detail (see FIG. 29). It should be noted that at least a part of these pieces of information may be copied to the main storage device 352 if needed, and may be referred to by the central control device 351. In addition, programs executed by the central control device 351 may be stored in the auxiliary storage device 353, and at least a part of the programs may be copied to the main storage device 352 if needed.

Here, an outline of a function realized by each program held by the main storage device 352 will be described.

The robot management unit 361 is a main program of the robot 101. Specifically, the robot management unit 361 receives work plan information from the entire management computer 109 using the communication device 354, and performs the work using each equipment and function. The work procedure (for example, a series of work flows such as recognition of the sorting box 105, recognition of the storage box 103, recognition of the article 251, taking out the article 251, and boxing the article 251) at the time is programmed.

When the above-described work is completed, the robot management unit 361 notifies the entire management computer 109 of work completion using the communication device 354. In addition, after performing operations such as taking out the article 251 from the storage box 103 and storage into the sorting box 105, the robot management unit 361 updates the in-box article arrangement information 381.

The mechanism control unit 362 controls the arm 201 and the hand 203. Specifically, the mechanism control unit 362 receives time-series data of an arm posture and a hand state created by the operation plan unit 366, and accordingly operates the arm 201 and the hand 203.

The sensor control unit 363 controls the article recognition sensor 202, the storage box recognition sensor 204, and the sorting box recognition sensor 205. For example, in the case where these sensors are cameras or distance image sensors, the sensor control unit 363 instructs these sensors to photograph, and receives data of images or distance images.

The box recognition unit 364 processes the data obtained from the storage box recognition sensor 204 and the sorting box recognition sensor 205, and confirms the IDs (identification information) of the storage box 103 and the sorting box 105 to identify the positions and directions thereof. The identification is performed by reading, for example, characters or bar codes put on the boxes. The position postures are recognized by, for example, measuring the front surfaces of the boxes and collating with shape data of the boxes. For example, in the case where two-dimensional bar codes are put on the boxes and the put positions and directions are held as box recognition data, the identification can be also performed by measuring and reading the same.

The article recognition unit 365 processes the data obtained from the article recognition sensor 202, and recognizes the position and direction of the article 251 put in the storage box 103. For example, the position and direction of the article 251 can be recognized by holding a pattern of the surface of the article as article recognition data and searching the article recognition data for the pattern of a photographed image. In the case where a plurality of articles 251 is taken out from the same storage box 103, the article recognition unit 365 may simultaneously recognize the articles 251 corresponding to the number thereof.

The operation plan unit 366 plans operations of the arm 201 and the hand 203 at the time of work such as recognizing the article, taking out the article, and boxing the article (namely, storing into the box).

In the article recognition, the operation plan unit 366 preliminarily defines an arm posture with which the field of view of the article recognition sensor 202 approximately matches the entire storage box 103 as a posture at the time of recognition, and creates time-series data of the arm postures shifting from the current posture to the posture at the time of recognition.

As a simple method of creating the time-series data between two postures, each joint angle of the arm 201 is linearly changed.

When taking out the article, the operation plan unit 366 selects an article 251 to be taken out from the arrangement of the articles 251 obtained by the article recognition unit 365, and calculates an arm posture at the time of gripping on the basis of a relative hand position and direction at the time of gripping. The operation plan unit 366 preliminarily defines arm postures before and after taking out the article, and creates time-series data of a series of arm postures and hand states in which the posture before taking out the article is changed to the posture at the time of gripping, the hand is put in a gripping state, and the posture at the time of gripping is changed to the posture after taking out the article.

When boxing the article, the operation plan unit 366 determines the ideal insertion position and installation position of the article 251 on the basis of the article 251 that has been taken out, the current article arrangement in the sorting box 105, and boxing error information. In addition, the operation plan unit 366 calculates arm postures at the time of insertion and installation on the basis of a relative hand position and direction at the time of gripping. The operation plan unit 366 preliminarily defines arm postures before and after boxing, and creates time-series data of a series of arm postures and hand states in which the posture before boxing is changed to the posture at the time of installation through the posture at the time of insertion, the hand is put in a release state, and the posture at the time of installation is changed to the posture after boxing.

Next, information held by the entire management computer 109 and the robot 101 will be described.

Figure 20:
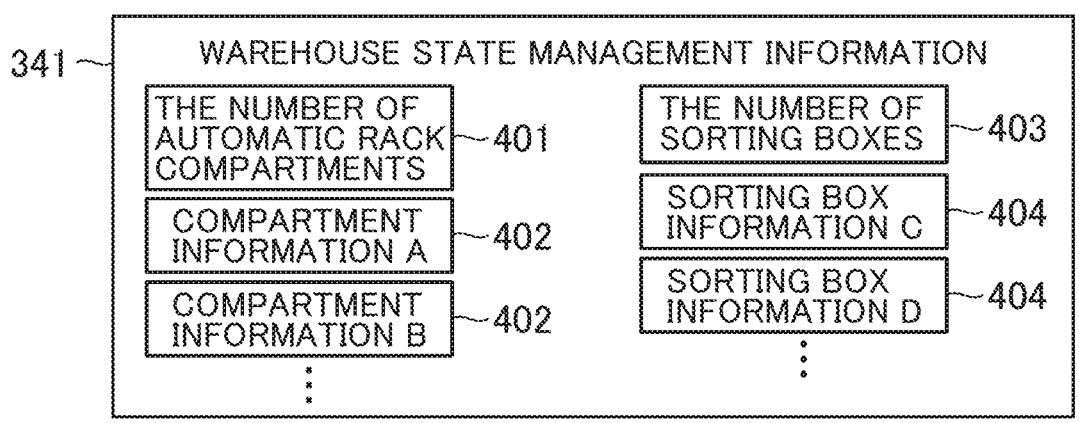
FIG. 20 is an explanatory diagram of warehouse state management information held by an entire management computer according to the embodiment of the present invention.

FIG. 20 is an explanatory diagram of the warehouse state management information 341 held by the entire management computer 109 according to the embodiment of the present invention.

The warehouse state management information 341 is information for managing the state of the warehouse, for example, the states of each automatic rack 108 and each sorting box 105 in the warehouse, and includes the number of automatic rack compartments 401, compartment information 402, the number of sorting boxes 403, and sorting box information 404.

The number of automatic rack compartments 401 is a total of compartments of the automatic rack 108 in the warehouse. The compartment information 402 is information indicating the state of each compartment. FIG. 20 shows compartment information A related to a compartment and compartment information B related to another compartment in the warehouse as the compartment information 402. Although not shown in FIG. 20, the compartment information 402 for each of all the compartments of all the automatic racks 108 in the warehouse may be actually held. The compartment information 402 will be described later in detail (see FIG. 25).

The number of sorting boxes 403 is a total of the sorting boxes 105 for sorting work. The sorting box information 404 is information indicating the state of each sorting box 105. FIG. 20 shows sorting box information C related to a sorting box 105 and sorting box information D related to another sorting box 105 in the warehouse as the sorting box information 404. Although not shown in FIG. 20, the sorting box information 404 for each of all the sorting boxes 403 for sorting work may be actually held. The sorting box information 404 will be described later in detail (see FIG. 26).

Figure 21:
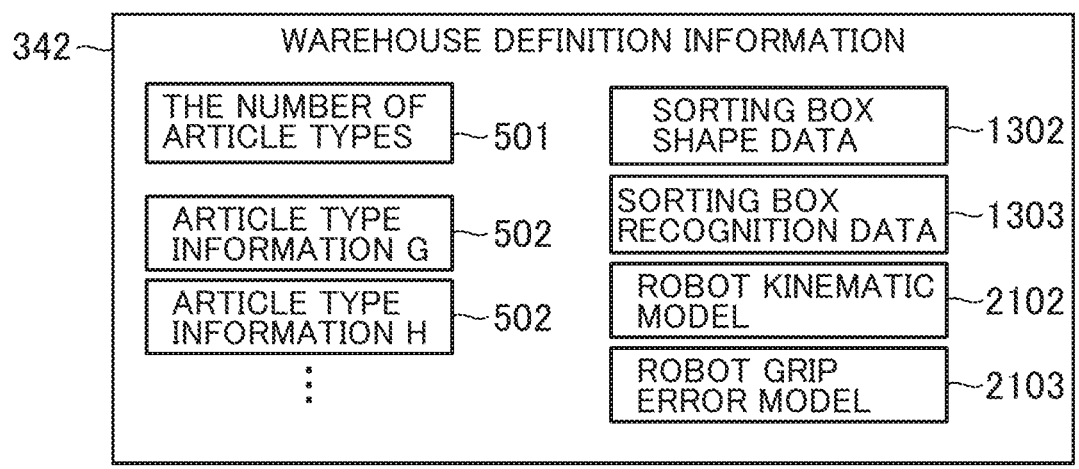
FIG. 21 is an explanatory diagram of warehouse definition information held by the entire management computer and the robot according to the embodiment of the present invention.

FIG. 21 is an explanatory diagram of the warehouse definition information 342 held by the entire management computer 109 and the robot 101 according to the embodiment of the present invention.

The warehouse definition information 342 includes the number of article types 501, article type information 502, sorting box shape data 1302, sorting box recognition data 1303, a robot kinematic model 2102, and a robot grip error model 2103.

The number of article types 501 is the number of types of articles stored in the warehouse. The article type information 502 is information related to the type of each article. FIG. 21 shows article type information G and article type information H as the article type information 502. These exemplify the article type information 502 related to two of all the types of articles stored inside the warehouse, and the article type information 502 related to all the types of articles stored inside the warehouse is actually held. The article type information 502 will be described later in detail (see FIG. 27).

The sorting box shape data 1302 is information of the shape (for example, the dimension and the like of each part) of the sorting box 105. For example, in the case where a two-dimensional bar code or the like is attached at a predetermined position of the sorting box 105, the sorting box recognition data 1303 may include information indicating the attached position and direction. When the sorting box recognition sensor 205 reads the two-dimensional bar code, the box recognition unit 364 can identify the position and posture of the sorting box 105 on the basis of a result of the reading, the sorting box recognition data 1303, and the sorting box shape data 1302.

The robot kinematic model 2102 is information for associating the state of a joint such as the arm 201 of the robot 101 with the position of the tip end of the hand 203, and is referred to when the operation Plan unit 366 plans an operation of the arm 201 to move the hand 203 to a desired position.

The robot grip error model 2103 includes information such as the maximum value of an error assumed when the position and posture of an article are recognized by the robot 101. The robot grip error model 2103 will be described later in detail (see FIG. 28).

Figure 22:
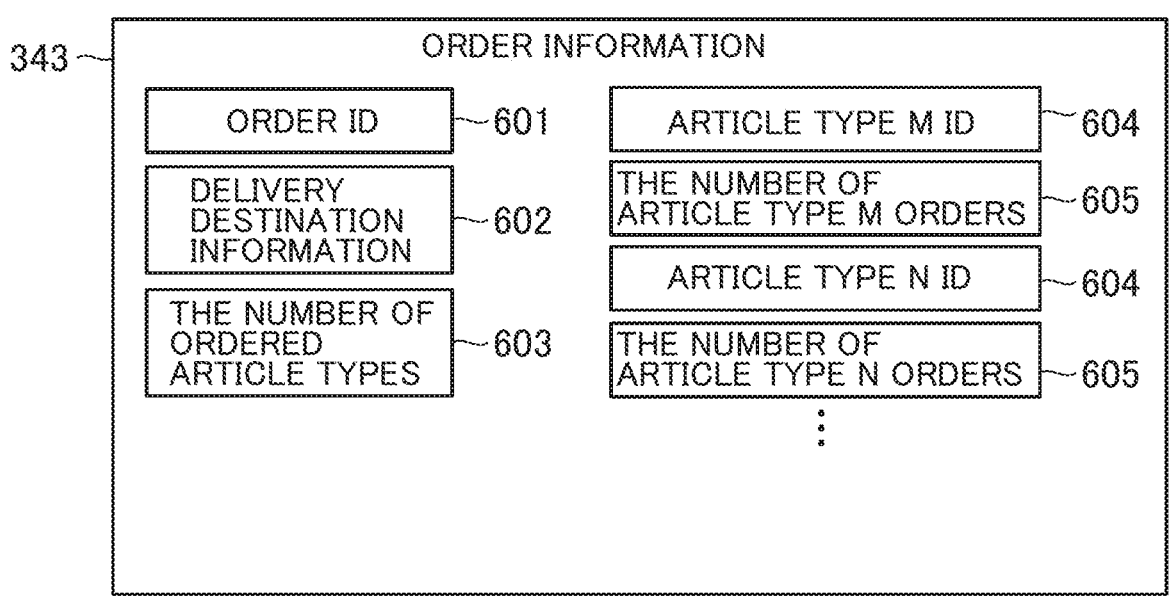
FIG. 22 is an explanatory diagram of order information held by the entire management computer according to the embodiment of the present invention.

FIG. 22 is an explanatory diagram of the order information 343 held by the entire management computer 109 according to the embodiment of the present invention.

The order information 343 is information indicating an order of articles accepted from each delivery destination, namely, the types and number of articles to be delivered to each delivery destination. Specifically, the order information 343 includes an order ID 601, delivery destination information 602, the number of ordered article types 603, an article type ID 604, and the number of article type orders 605. The sorting work in the working area for the robot 101 includes work in which the robot 101 takes out articles of ordered types corresponding to the number of orders in accordance with the order information 343 from the storage box 103, and stores the same into the sorting box 105 corresponding to the delivery destination that placed the orders.

The order ID 601 is information discriminating each order. For example, information related to one order accepted from one delivery destination is discriminated by one order ID. FIG. 22 shows only information related to one order accepted from one delivery destination as an example. However, one or more orders may be accepted from a plurality of delivery destinations. As an example of a handling method in this case, the order information 343 may be created for each delivery destination, orders from the same delivery destination may be unified into one, and a unique order ID may be allocated to each order information 343.

The delivery destination information 602 is information indicating the delivery destination that placed an order, namely, information indicating the delivery destination of an ordered article. The number of ordered article types 603 is the number of ordered articles, namely, the number of types of articles to be delivered to a delivery destination.

The article type ID 604 and the number of article type orders 605 are the type of an ordered article and the number of articles of the ordered type, respectively. In the case where articles of plural types are ordered, a plurality of sets of the article type ID 604 and the number of article type orders 605 is included in the order information 343.

As sets of the article type ID 604 and the number of article type orders 605, FIG. 22 exemplifies a set of an article type M ID and the number of article type M orders and a set of an article type N ID and the number of article type N orders. However, the order information 343 may actually include a set of the article type ID 604 and the number of article type orders 605 related to an article of still another type.

Figure 23:
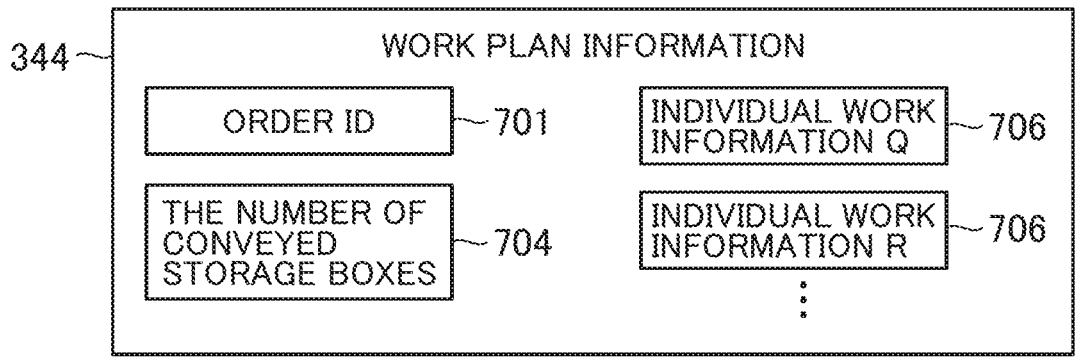
FIG. 23 is an explanatory diagram of work plan information held by the entire management computer according to the embodiment of the present invention.

FIG. 23 is an explanatory diagram of the work plan information 344 held by the entire management computer 109 according to the embodiment of the present invention.

The work plan information 344 is information related to a plan of sorting work to be carried out in the warehouse, and includes an order ID 701, the number of conveyed storage boxes 704, and individual work information 706.

The order ID 701 is identification information of an order as a target of a work plan. The number of conveyed storage boxes 704 is the number of storage boxes 103 conveyed in the work plan. The individual work information 706 is information related to work for each storage box 103.

FIG. 23 exemplifies individual work information Q and individual work information R as the individual work information 706. However, the individual work information 706 is actually held for each of all the storage boxes 103 for which work needs to be performed. The individual work information 706 will be described later in detail (see FIG. 24).

Figure 24:
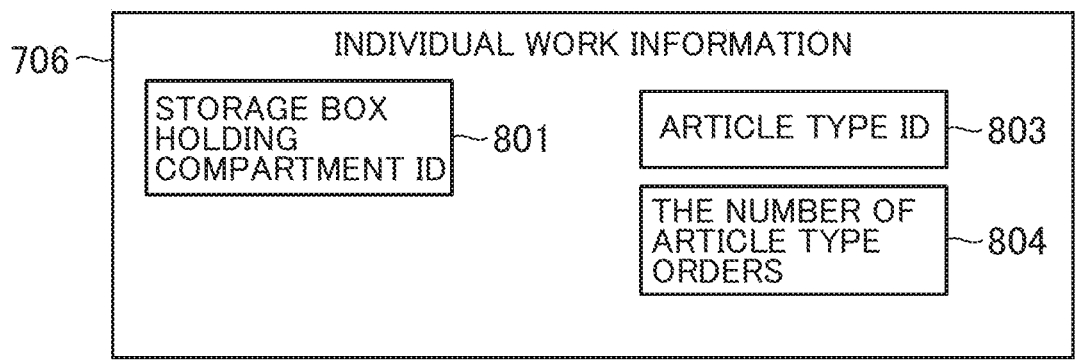
FIG. 24 is an explanatory diagram of individual work information held by the entire management computer according to the embodiment of the present invention.

FIG. 24 is an explanatory diagram of the individual work information 706 held by the entire management computer 109 according to the embodiment of the present invention.

The individual work information 706 is information related to work for each storage box 103, and includes a storage box holding compartment ID 801, an article type ID 803, and the number of article type orders 804. The storage box holding compartment ID 801 is information for identifying a compartment of the automatic rack 108 holding the storage box 103 for work. The article type ID 803 is information for identifying the type of an ordered article. The number of article type orders 804 indicates the number of ordered articles.

Figure 25:
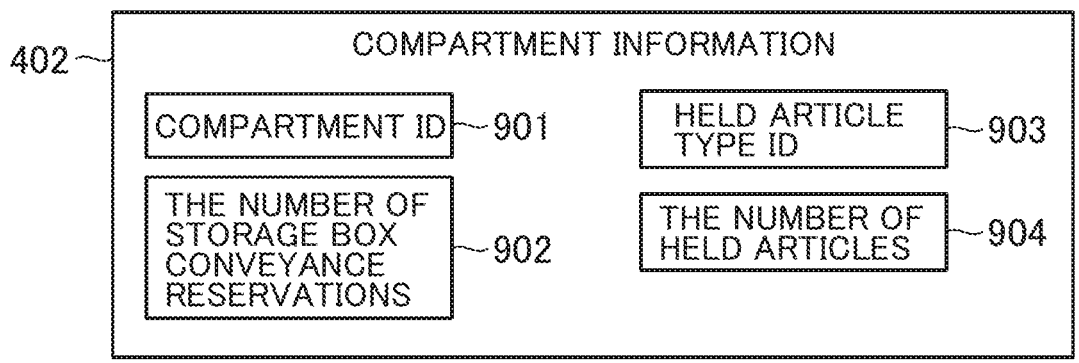
FIG. 25 is an explanatory diagram of compartment information held by the entire management computer according to the embodiment of the present invention.

FIG. 25 is an explanatory diagram of the compartment information 402 held by the entire management computer 109 according to the embodiment of the present invention.

The compartment information 402 is information indicating the state of each compartment, and includes a compartment ID 901, the number of storage box conveyance reservations 902, a held article type ID 903, and the number of held articles 904. The compartment ID 901 is information for identifying each compartment. The number of storage box conveyance reservations 902 indicates whether or not a reservation of conveying the storage box 103 held in each compartment to the working area for sorting work has been made, and the number of reservations in the case where the reservation has been made. The held article type ID 903 is information for identifying the type of an article to be stored into the storage box 103 held in each compartment. The number of held articles 904 indicates the number of articles to be stored into the storage box 103 held in each compartment.

Figure 26:
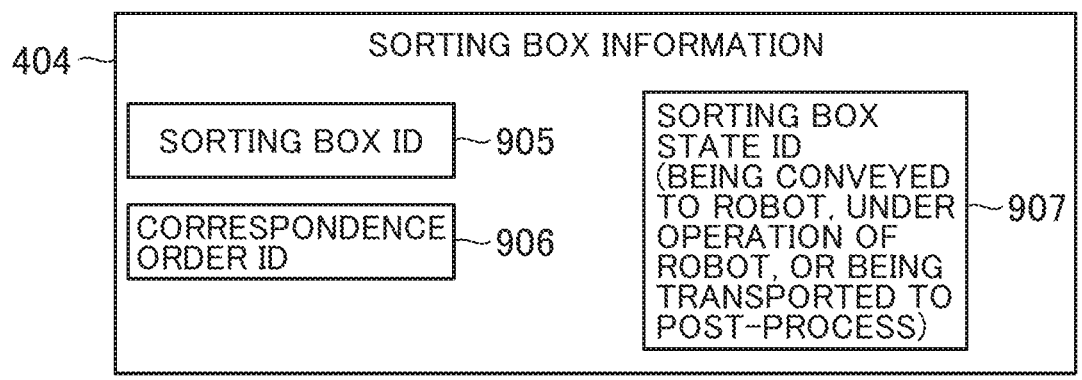
FIG. 26 is an explanatory diagram of sorting box information held by the entire management computer according to the embodiment of the present invention.

FIG. 26 is an explanatory diagram of the sorting box information 404 held by the entire management computer 109 according to the embodiment of the present invention.

The sorting box information 404 is information indicating the state of each sorting box 105, and includes a sorting box ID 905, a correspondence order ID 906, and a sorting box state ID 907. The sorting box ID 905 is information for identifying each sorting box 105.

The correspondence order ID 906 is information for identifying an order corresponding to each sorting box 105. For example, in the case where information for identifying an order from a delivery destination is held as the correspondence order ID 906 of the sorting box information 404 for a sorting box 105, the article 251 to be delivered to the delivery destination is stored into the sorting box 105 in accordance with the order in sorting work.

The sorting box state ID 907 is information for identifying the state of each sorting box 105. The state of the sorting box 105 is, for example, "being conveyed towards the working area for the robot 101, "under operation of the robot 101, or "being conveyed to a post-process after completion of work by the robot 101.

Figure 27:
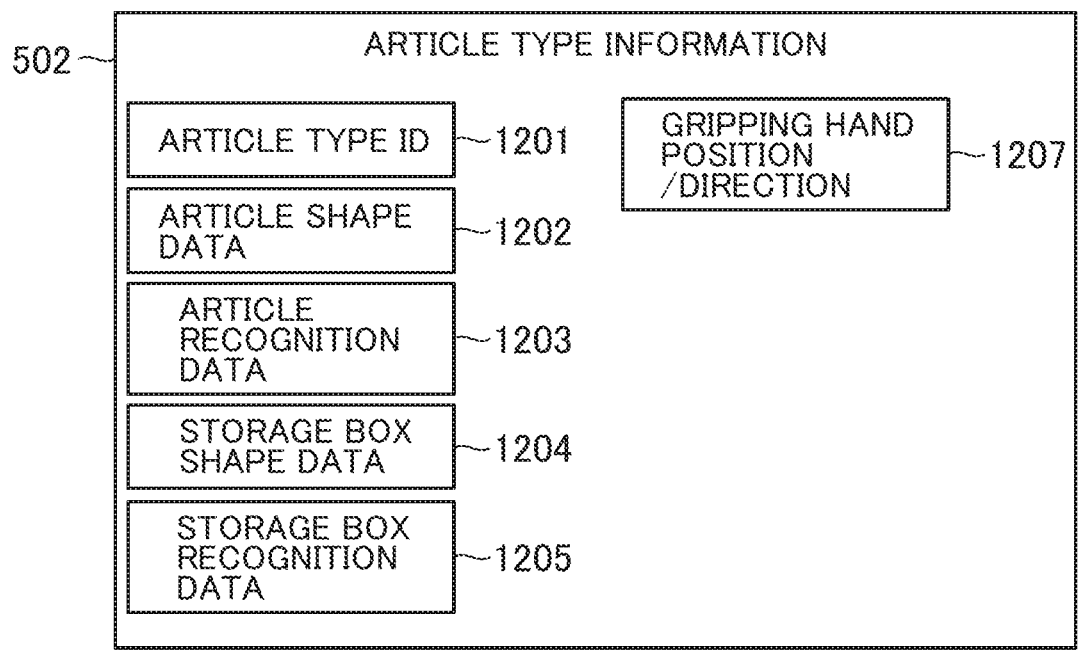
FIG. 27 is an explanatory diagram of article type information held by the entire management computer and the robot according to the embodiment of the present invention.

FIG. 27 is an explanatory diagram of the article type information 502 held by the entire management computer 109 and the robot 101 according to the embodiment of the present invention.

The article type information 502 includes an article type ID 1201, article shape data 1202, article recognition data 1203, storage box shape data 1204, storage box recognition data 1205, and a gripping hand position/direction 1207.

The article type ID 1201 is information for identifying the type of the article 251. The article shape data 1202 is data showing the shape of the article 251 of the type. The article recognition data 1203 is data used to recognize the article 251 of the type. For example, in the case where patterns, characters, or the like unique to the type are displayed on the surface of the article 251 of the type, the article recognition data 1203 may include information of the patterns, the characters, or the like.

The storage box shape data 1204 is data showing the shape of the storage box 103 in which the article 251 is stored. The storage box recognition data 1205 is data used to recognize the storage box 103, and has information that can specify each storage box 103. For example, in the case where a two-dimensional bar code or the like read by the storage box recognition sensor 204 is attached to the storage box 103, the storage box recognition data 1205 may include information of the content of the two-dimensional bar code and the attached position and direction.

The gripping hand position/direction 1207 indicates the grip position and direction when the robot 101 grips the article 251 of the type using the hand 203. For example, in the case where the finger-type hand 203a is used, information indicating the position and direction of the article 251 sandwiched by the fingers 209 may be included. In addition, in the case where the suction hand 203b is used, information indicating the position of the article 251 sucked by the suction pad 210a and the direction of the suction hand 203b when the suction pad 210a sucks the article 251 may be included.

Figure 28:
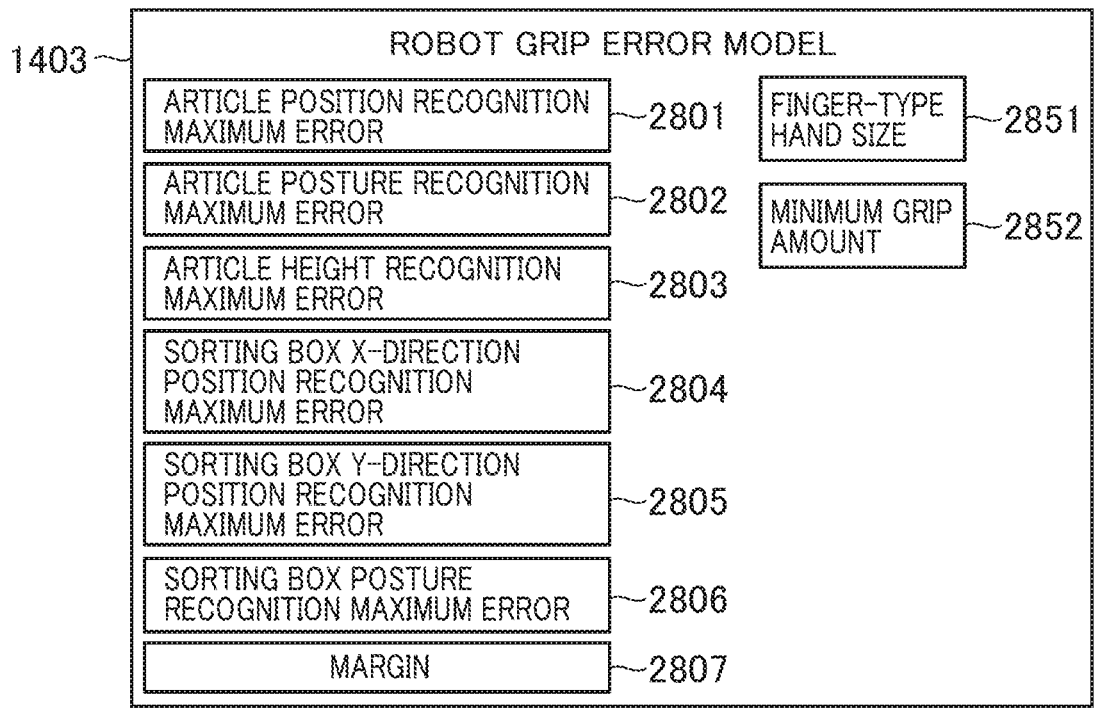
FIG. 28 is an explanatory diagram of a robot grip error model held by the entire management computer and the robot according to the embodiment of the present invention.

FIG. 28 is an explanatory diagram of the robot grip error model 2103 held by the entire management computer 109 and the robot 101 according to the embodiment of the present invention.

The robot grip error model 2103 includes an article position recognition maximum error 2801, an article posture recognition maximum error 2802, an article height recognition maximum error 2803, a sorting box x-direction position recognition maximum error 2804, a sorting box y-direction position recognition maximum error 2805, a sorting box posture recognition maximum error 2806, a margin 2807, a finger-type hand size 2851, and a minimum grip amount 2852.

The article position recognition maximum error 2801, the article posture recognition maximum error 2802, and the article height recognition maximum error 2803 are the maximum values of errors assumed in a recognition result when the article recognition unit 365 recognizes the position, posture, and height of the article 251 on the basis of the recognition result of the article recognition sensor 202, and correspond to $\Delta P$, $\Delta D$, and $\Delta Q$, respectively, described with reference to FIGS. 5A, 5B, 5C and 5D. These are values preliminarily set on the basis of a sensing method of the article recognition sensor 202 and a calculating method of the position, the posture, and the direction based on a result of the sensing.

The sorting box x-direction position recognition maximum error 2804, the sorting box y-direction position recognition maximum error 2805, and the sorting box posture recognition maximum error 2806 are the maximum values of errors assumed in a recognition result when the box recognition unit 364 recognizes the position and the posture of the sorting box 105 on the basis of the recognition result of the sorting box recognition sensor 205, and correspond to $\Delta X$, $\Delta Y$, and $\Delta P$, respectively, described with reference to FIG. 6. These are values preliminarily set on the basis of a sensing method of the sorting box recognition sensor 205 and a calculating method of the position and the posture based on a result of the sensing.

The margin 2807 is a value set as room so that when the article 251 is stored into the sorting box 105, damage caused by contact with a wall surface of the sorting box 105 or another article 251 is prevented, and corresponds to the margin e described with reference to FIG. 6 and the like. As the margin 2807, an arbitrary value equal to or larger than 0 can be set. As the value is larger, the risk of damage of the article 251 is reduced. However, if the value is extremely large, it is difficult to insert the article 251 into the sorting box 105 while securing the space thereof in some cases. In addition, the use efficiency of the volume of the sorting box 105 is deteriorated in some cases.

The finger-type hand size 2851 indicates the size of the finger-type hand 203a in the case where the robot 101 has the same. The size is used to calculate the size (distance W) of a space that needs to be secured between an inner wall surface of the sorting box 105 and a side surface of the article 251 in order to insert the finger 209, as described with reference to FIGS. 5A, 5B, 5C and 5D.

The minimum grip amount 2852 is the minimum value of a distance from the upper surface of the article 251 to the tip end of the finger 209 that needs to be secured to stably grip the article 251, and corresponds to the minimum grip amount Lmin described with reference to FIGS. 5A, 5B, 5C and 5D.

Figure 29:
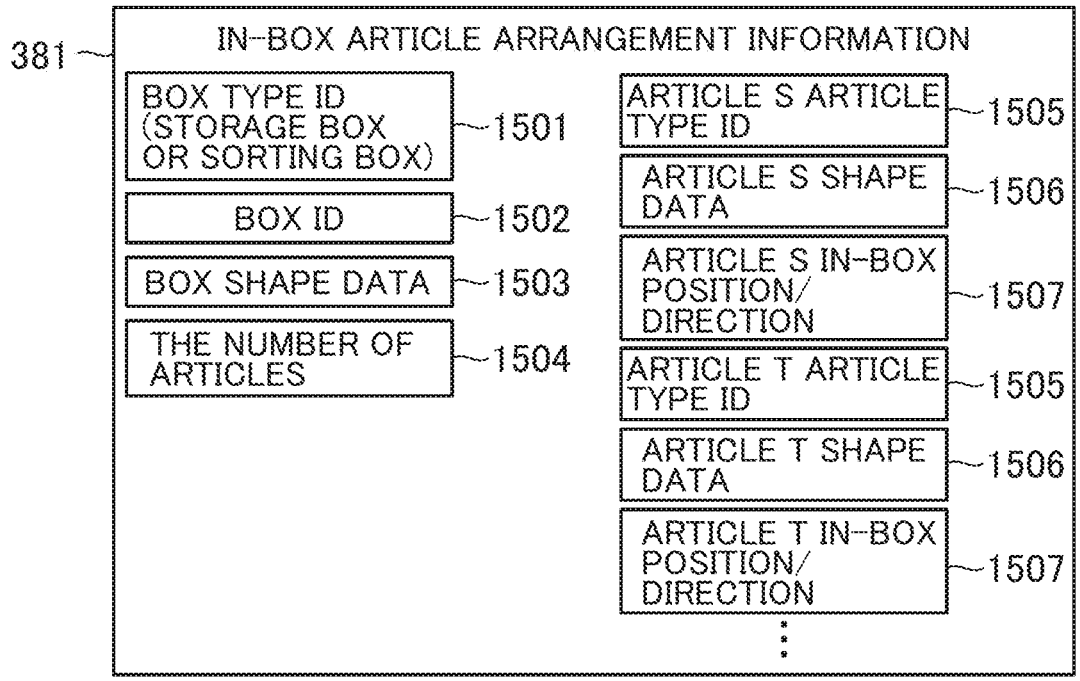
FIG. 29 is an explanatory diagram of in-box article arrangement information held by the robot according to the embodiment of the present invention.

FIG. 29 is an explanatory diagram of the in-box article arrangement information 381 held by the robot 101 according to the embodiment of the present invention.

The in-box article arrangement information 381 includes information related to the articles 251 stored in each of the storage box 103 from which the robot 101 takes out the article 251 and the sorting box 105 into which the robot 101 stores the article 251. Specifically, the in-box article arrangement information 381 includes a box type ID 1501, a box ID 1502, box shape data 1503, the number of articles 1504, an article type ID 1505, shape data 1506, and an in-box position/direction 1507.

The box type ID 1501 is information for identifying that each box is the storage box 103 or the sorting box 105. The box ID 1502 is information for identifying each box. The box shape data 1503 is information indicating the shape (for example, the dimensions such as the length, width, height, and the like) of each box. The number of articles 1504 indicates the number of articles 251 stored in each box.

The article type ID 1505, the shape data 1506, the in-box position/direction 1507 indicate the type and shape of the article 251 stored in the box and the position and direction (posture) in the box where the article 251 is placed. In the case where a plurality of articles 251 is stored in one box, a set of the article type ID 1505, the shape data 1506, and the in-box position/direction 1507 is stored in the in-box article arrangement information 381 for each article.

In the example of FIG. 29, a set of an article S article type ID, article S shape data, and an article S in-box position/direction and a set of an article T article type ID, article T shape data, and an article T in-box position/direction are registered as sets of the article type ID 1505, the shape data 1506, and the in-box position/direction 1507. However, in the case where three or more articles 251 are stored in the box, information similar to the above is registered for the remaining articles 251.

Next, operations of the entire management computer 109 and the robot 101 will be described.

Figure 30:
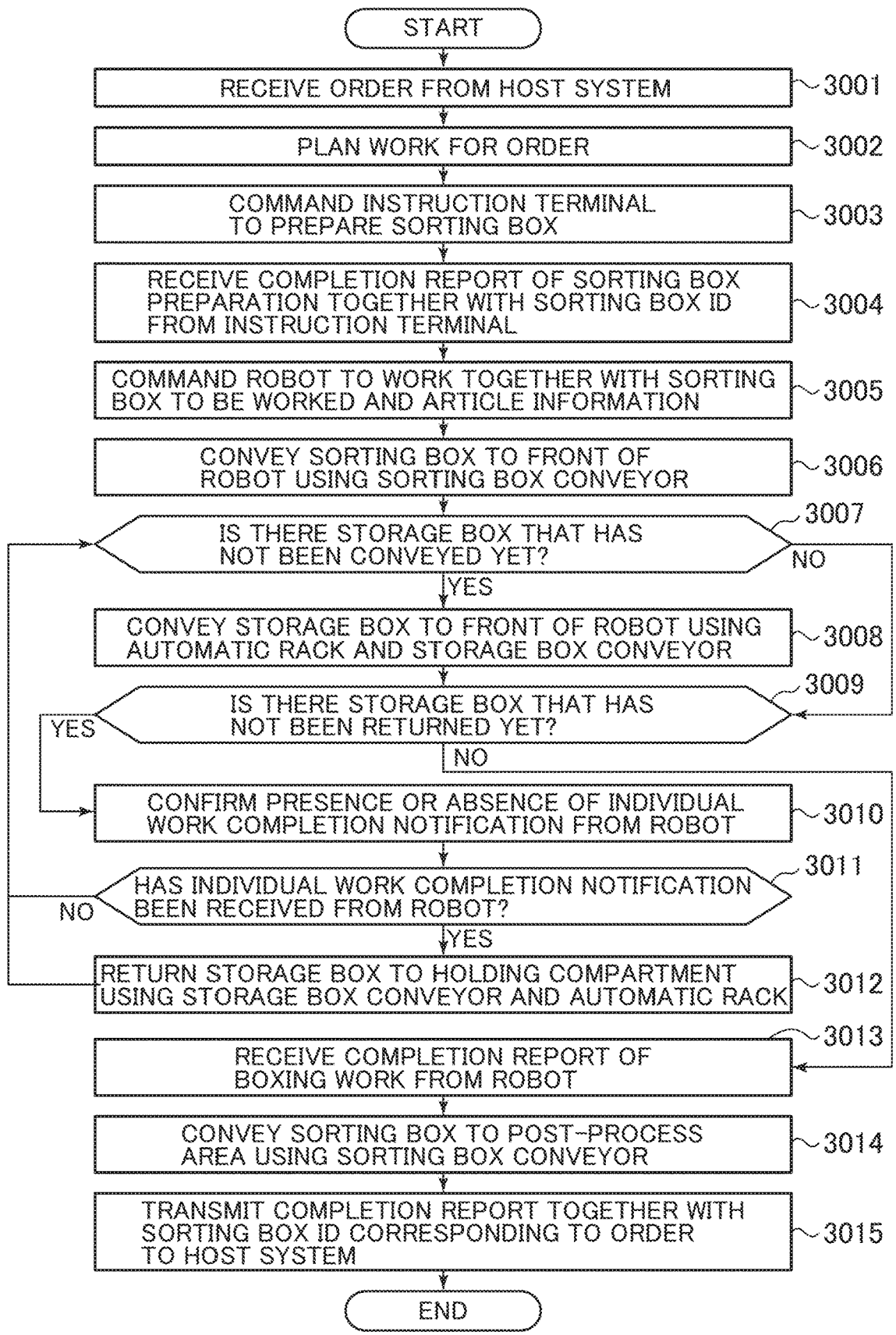
FIG. 30 is a flowchart for showing processes executed for each order by the entire management computer according to the embodiment of the present invention.

FIG. 30 is a flowchart for showing processes executed for each order by the entire management computer 109 according to the embodiment of the present invention.

First, the order processing unit 331 of the entire management computer 109 receives the order information 343 (FIG. 22) from the host system 110, and stores the same into the auxiliary storage device 313 (Step 3001).

Next, the order processing unit 331 plans work for the received order information 343 (Step 3002). Specifically, the order processing unit 331 refers to the warehouse state management information 341 (FIG. 20) and the warehouse definition information 342 (FIG. 21) in addition to the order information 343, and creates the work plan information 344 (FIG. 23) to be stored into the auxiliary storage device 313. This process will be described later in detail (see FIG. 31).

At this time, the order processing unit 331 increments the number of storage box conveyance reservations 902 of the compartment information 402 (FIG. 25) by 1 and decrements the number of held articles 904 by the number of orders for the compartment of the automatic rack 108 corresponding to the storage box 103 that needs to be conveyed to the working area for the robot 101 in accordance with the created work plan information 344.

Next, the order processing unit 331 transmits an instruction of preparing the sorting box 105 to the instruction terminal 107 (Step 3003). The instruction terminal 107 outputs the received instruction to the worker 106. The worker 106 prepares one sorting box 105 of the instructed type, attaches a label on which a unique ID is described to the sorting box 105 as a sorting box ID, and installs the sorting box 105 on the sorting box conveyor 104. Thereafter, the worker 106 transmits notification of preparation completion to the sorting box conveyor 104 via the instruction terminal 107.

Next, the worker 106 inputs information indicating that the preparation of the sorting box 105 has been completed and the ID for identifying the installed sorting box 105 into the instruction terminal 107. The instruction terminal 107 transmits the input information to the entire management computer 109. When receiving the pieces of information (Step 3004), the order processing unit 331 increments the number of sorting boxes 403 of the warehouse state management information 341 (FIG. 20) by 1 to create the sorting box information 404 corresponding to the sorting box 105. The sorting box state ID 907 (FIG. 26) of the created sorting box information 404 is "being conveyed to robot".

Next, the order processing unit 331 transmits an instruction of work to the robot 101 (Step 3005). At this time, the order processing unit 331 transmits both of all pieces of individual work information 706 (FIG. 24) handled by the robot and the sorting box ID for identifying the sorting box 105 as a target of work.

Next, the order processing unit 331 transmits to the sorting box conveyor 104 an instruction of conveying the installed sorting box 105 to the working area for the robot 101 (Step 3006). The sorting box conveyor 104 having received the instruction conveys the sorting box 105 to the working area for the robot 101. When the conveyance is completed, the sorting box state ID 907 (see FIG. 26) of the sorting box information 404 corresponding to the sorting box 105 is changed to "under operation of robot".

The box recognition unit 364 of the robot 101 recognizes the ID of the sorting box 105 on the basis of a sensing result of the sorting box recognition sensor 205. In the case where work corresponding to a plurality of orders is conducted in parallel, the robot 101 grasps a correspondence relation between each sorting box 105 and each order on the basis of the ID of the sorting box 105 that has arrived.

In addition, in the case where a sorting box 105 has already arrived at the working area for the robot 101 and work is being conducted by the robot 101 when another sorting box 105 corresponding to a different order is being conveyed towards the working area, the sorting box conveyor 104 allows the sorting box 105 that is being conveyed to wait before the working area. In addition, when the sorting box 105 that has already arrived is moved to the outside of the working area after completion of the work, the sorting box 105 that has been waiting may be moved to the working area.

Next, the order processing unit 331 determines whether or not there is a storage box 103 that has not been conveyed to the working area yet in the individual work information 706 in which work is conducted by the robot 101 (Step 3007). In the case where there is a storage box 103 that has not been conveyed yet, one of the pieces of individual work information 706 corresponding thereto is selected, and the process proceeds to Step 3008. On the other hand, in the case where there is no storage box 103 that has not been conveyed yet, the process proceeds to Step 3009 by skipping Step 3008.

In Step 3008, the order processing unit 331 transmits an instruction of conveying the storage box 103 corresponding to the selected individual work information 706 to the automatic rack 108 and the storage box conveyor 102. On the basis of the instruction, the automatic rack 108 and the storage box conveyor 102 convey the corresponding storage box 103 to the working area (Step 3008).

At this time, in the case where another storage box 103 corresponding to a different order has already arrived at the working area and work is being conducted by the robot 101, the storage box conveyor 102 allows the storage box 103 that is being conveyed to wait before the working area, and the flow proceeds to Step 3009. Thereafter, when returning the storage box 103 in the working area to the automatic rack 108 (Step 3012), the storage box conveyor 102 conveys the storage box 103 that has been waiting to the inside of the working area.

When the storage box 103 is conveyed to the working area, the box recognition unit 364 of the robot 101 recognizes the ID of the storage box 103 on the basis of a sensing result of the storage box recognition sensor 204, and recognizes the type of the article 251 stored therein. Next, the robot 101 searches for the individual work information 706 corresponding to the recognized type of the article 251, confirms the number of articles 251 to be taken out from the storage box 103 and to be boxed into the sorting box 105, and executes the work. A procedure of the work to be executed will be described later in detail (see FIG. 32).

Next, the order processing unit 331 determines whether or not there is a storage box 103 among the conveyed storage boxes 103 that has not been returned from the working area to the automatic rack 108 yet (Step 3009). In the case where there is a storage box 103 that has not been returned yet, the order processing unit 331 confirms whether or not completion notification of the individual work has been received from the robot 101. If the completion notification has not been received, the order processing unit 331 waits for reception in a predetermined period of time (Step 3010). In the case where the completion notification of the individual work has not been received after the predetermined period of time (Step 3011: No), the process returns to Step 3007, and the processes subsequent to Step 3007 are repeatedly executed. In the case where the completion notification of the individual work has been received from the robot 101 (Step 3011: Yes), the order processing unit 331 instructs the storage box conveyor 102 to convey the storage box 103 to return the storage box 103 to a holding compartment of the automatic rack 108, and decrements the number of storage box conveyance reservations 902 of the compartment information 402 corresponding to the compartment by 1 (Step 3012).

Thereafter, the process is returned to Step 3007, and the processes subsequent to Step 3007 are repeatedly executed.

In the case where it is determined that there is no storage box 103 that has not been returned yet in Step 3009, the work of boxing all the articles 251 corresponding to the order into the sorting box 105 has been completed. Therefore, the order processing unit 331 receives completion notification of the boxing work from the robot 101 (Step 3013), and transmits to the sorting box conveyor 104 an instruction of conveying the sorting box 105 to a post-process area (not shown in the drawing) (Step 3014). At this time, the order processing unit 331 changes the sorting box state ID 907 of the sorting box information 404 corresponding to the sorting box 105 to "being transported to post-process".

When the conveyance of the sorting box 105 to the post-process area is completed, the order processing unit 331 transmits to the host system 110 completion notification of the order together with the sorting box ID for identifying the conveyed sorting box 105 (Step 3015). Further, the order processing unit 331 deletes the sorting box information 404 corresponding to the sorting box 105 from the warehouse state management information 341, and decrements the number of sorting boxes 403 by 1.

As described above, the work corresponding to the order received in Step 3001 is completed.

Figure 31:
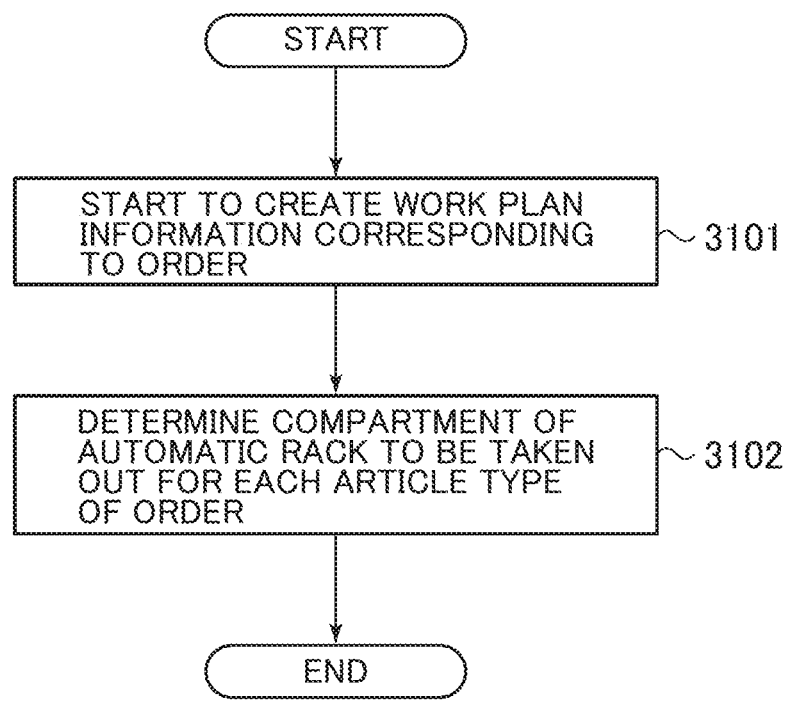
FIG. 31 is a flowchart for showing processes of creating a work plan for each order by the entire management computer according to the embodiment of the present invention.

FIG. 31 is a flowchart for showing processes of creating a work plan for each order by the entire management computer 109 according to the embodiment of the present invention.

When receiving the order information 343 from the host system 110 in Step 3001 of FIG. 30, the order processing unit 331 starts processes of FIG. 31 in Step 3002.

First, the order processing unit 331 starts to create the work plan information 344 corresponding to the received order information 343 (Step 3101). Specifically, in the case where articles of one type are stored in one storage box 103, the order processing unit 331 sets the number of ordered article types 603 of the order information 343, as it is, as the number of conveyed storage boxes 704 of the work plan information 344, and creates pieces of individual work information 706 corresponding to the number. In addition, the order processing unit 331 registers the article type ID 803 and the number of article type orders 804 of each individual work information 706 on the basis of the order information 343.

Next, the order processing unit 331 determines the compartment of the automatic rack 108 from which the corresponding storage box 103 is taken out for each article type included in the order information 343 (Step 3102). Specifically, the order processing unit 331 searches the compartment information 402 of the warehouse state management information 341 for the compartment storing articles of each type included in the order information 343. In addition, the order processing unit 331 registers the ID of the searched compartment as storage box holding compartment 801 of the individual work information 706, and increments the number of storage box conveyance reservations 902 of the compartment information 402 corresponding to the compartment by 1.

At this time, in the case where articles of the same type are held in a plurality of compartments, the plurality of compartments can be obtained by the search in Step 3102. In this case, the order processing unit 331 may select a small number of storage box conveyance reservations 902 from the obtained compartments. Accordingly, the waiting time of conveyance of the storage box 103 can be reduced, and the sorting work can be efficiently conducted.

As described above, the creation of the work plan information 344 is completed.

Figure 32:
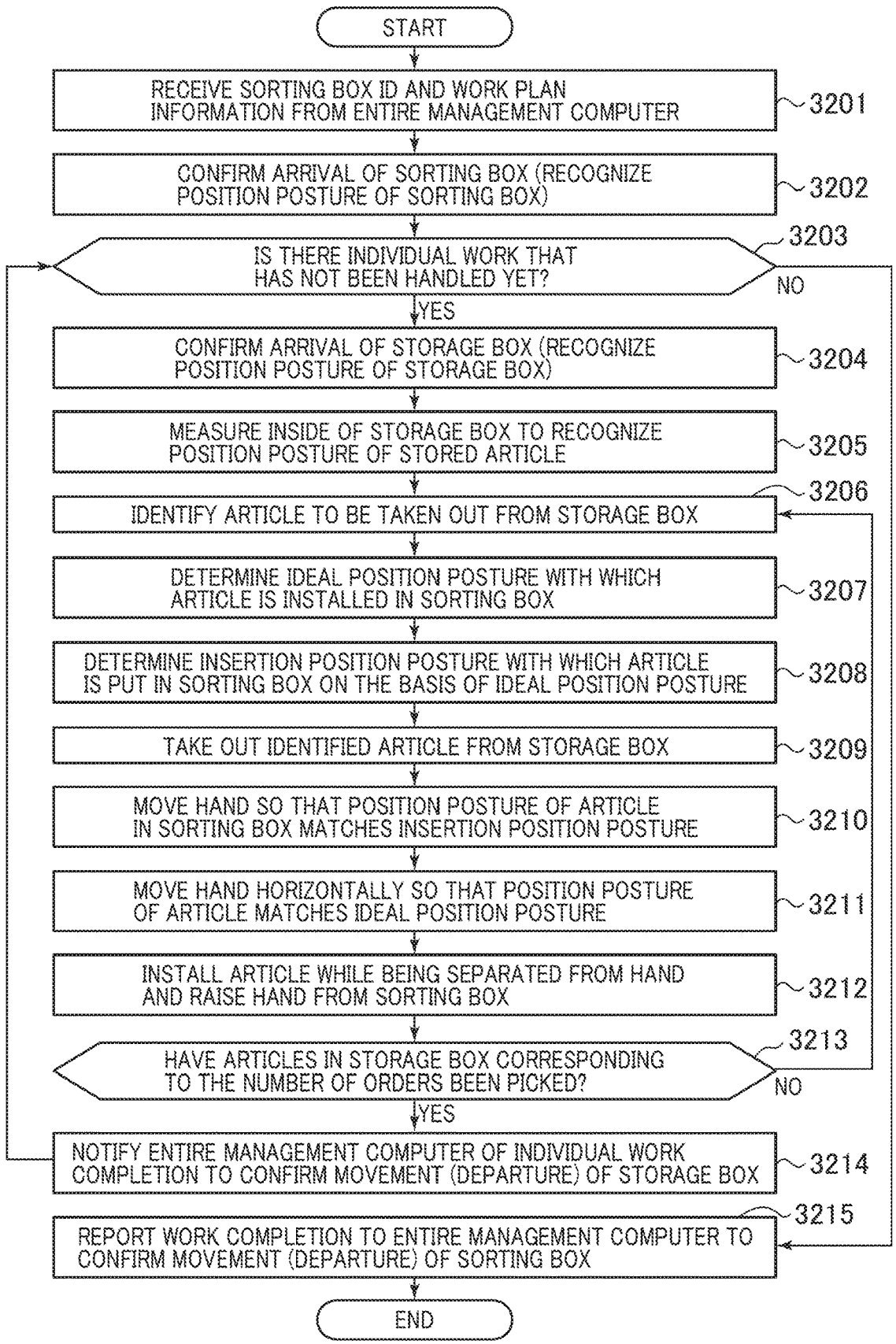
FIG. 32 is a flowchart for showing operations executed for each order by the robot according to the embodiment of the present invention.

FIG. 32 is a flowchart for showing operations executed for each order by the robot 101 according to the embodiment of the present invention.

First, the robot management unit 361 of the robot 101 receives the sorting box ID and the work plan information 344 from the entire management computer 109 (Step 3201). These are transmitted in Step 3005 of FIG. 30.

Next, the robot management unit 361 confirms that the sorting box 105 having the sorting box ID received in Step 3201 has arrived at the working area on the basis of a recognition result of the box recognition unit 364, and obtains a recognition result of the position and posture of the sorting box 105 (Step 3202).

Next, the robot management unit 361 determines whether or not there are pieces of individual work information 706 that have not been handled yet among those included in the received work plan information 344 (Step 3203). In the case where there are pieces of individual work information 706 that have not been handled yet, processes subsequent to Step 3204 are executed for one of them.

Next, the robot management unit 361 confirms that the storage box 103 corresponding to the target individual work information 706 has arrived at the working area on the basis of a recognition result of the box recognition unit 364, and obtains a recognition result of the position and posture of the storage box 103 (Step 3204).

The article recognition unit 365 measures the inside of the storage box 103 using the article recognition sensor 202, and recognizes the position and posture of each of the stored articles 251. When the recognition result has been obtained (Step 3205), the robot management unit 361 specifies the article 251 to be taken out therefrom (Step 3206).

Next, the robot management unit 361 determines the ideal position posture when the specified article 251 is installed into the sorting box 105 while referring to the in-box article arrangement information 381 and the robot grip error model 2103 (Step 3207). For example, in the case where the robot 101 has the finger-type hand 203a and the specified article 251 is installed into the sorting box 105 first, the ideal position posture may be determined at a position apart from a corner of the sorting box by a space equivalent to the assumed positional error or the finger size as shown in FIG. 6. Alternatively, in the case where other articles 251 have already been installed, the ideal position posture may be determined at a corner formed by the ideal position postures of the other articles 251 as in the case of the article 251m shown in FIG. 8E and FIG. 8F.

On the other hand, in the case where the robot 101 has the suction hand 203b and the specified article 251 is installed into the sorting box 105 first, the ideal position posture may be determined at a position apart from a corner of the sorting box by a space equivalent to the assumed position posture error as shown in FIG. 11. Alternatively, in the case where other articles 251 have already been installed, the ideal position posture may be determined at a corner formed by the ideal position postures of the other articles 251 as in the case of the article 251m shown in FIG. 13E and FIG. 13F.

Next, the robot management unit 361 determines the insertion position posture when the article 251 is inserted into the sorting box 105 on the basis of the determined ideal position posture (Step 3208). For example, in the case where the specified article 251 is installed into the sorting box 105 first, the ideal position posture determined in Step 3207 may be determined as the insertion position posture as it is. In the case where other articles 251 have already been installed and the robot 101 has the finger-type hand 203a, the insertion position posture may be determined at a position apart from the ideal position posture by a space equivalent to twice the assumed positional error as in the case of the article 251m shown in FIG. 8A and FIG. 8B. Alternatively, in the case where the robot 101 has the suction hand 203b, the insertion position posture may be determined at a position apart from the ideal position posture by a space equivalent to twice the assumed position posture error as in the case of the article 251m shown in FIG. 13A and FIG. 13B.

Next, the robot management unit 361 takes out the specified article 251 from the storage box 103 (Step 3209).

For example, the mechanism control unit 362 may take out the specified article 251 by operating the arm 201 and the hand 203 in accordance with an instruction from the robot management unit 361. The same applies to the operation by the hand 203 in the following description.

Next, the robot management unit 361 moves the hand 203 so that the position posture of the taken-out article 251 in the sorting box 105 matches the insertion position posture determined in Step 3208 (Step 3210).

Next, the robot management unit 361 horizontally moves the hand 203 so that the position posture of the article 251 in the horizontal direction matches the ideal position posture (Step 3211). For example, in the case where the robot 101 has the finger-type hand 203a, the finger-type hand 203a may be moved as shown in FIG. 8C and FIG. 8D. At this time, each article 251 is actually positioned as shown in, for example, FIG. 9C and FIG. 9D. In addition, in the case where the robot 101 has the suction hand 203b, the suction hand 203b may be moved as shown in FIG. 13C and FIG. 13D. At this time, each article 251 is actually positioned as shown in, for example, FIG. 15C, FIG. 16C, or FIG. 17B.

Next, the robot management unit 361 releases the article 251 from the hand 203 to be installed into the sorting box 105, and raises the hand 203 from the sorting box 105 (Step 3212).

Next, the robot management unit 361 determines whether or not the articles 251 in the storage box 103 corresponding to the number of orders have been picked (Step 3213). In the case where the articles 251 corresponding to the number of orders have not been picked yet, the process returns to Step 3206, and the remaining articles 251 are taken out from the storage box 103 and stored into the sorting box 105.

In the case where it is determined that the articles 251 corresponding to the number of orders have been picked in Step 3213, the robot management unit 361 transmits notification of completion of the work based on the individual work information 706 to the entire management computer 109, and confirms that the storage box 103 from which the articles 251 have been picked has started to move to be returned to the automatic rack 108 (Step 3214). Thereafter, the process returns to Step 3203.

In the case where it is determined that there is no individual work information 706 that has not been handled yet in Step 3203, storage of all the ordered articles 251 into the sorting box 105 having arrived in Step 3202 has been completed. Thus, the robot management unit 361 transmits notification of completion of the work based on the work plan information 344 received in Step 3201 to the entire management computer 109, and confirms that the sorting box 105 into which all the articles 251 have been stored has started to move for the post-process (Step 3215).

As described above, the processes for each order by the robot 101 are completed.

As described above, a robot system according to the embodiment of the present invention has a manipulator (for example, the arm 201 and the hand 203) that conveys a conveying object (for example, the article 251) to a conveyance destination (for example, the sorting box 105) having a bottom surface and a wall surface connected to the bottom surface. The robot system may execute a first process in which the manipulator puts a first conveying object (for example, the article 251j of FIGS. 9A, 9B, 9C and 9D, the article 251i of FIGS. 15A, 15B and 15C, or the like) on the bottom surface of the conveyance destination a second process in which the manipulator conveys a second conveying object (for example, the article 251m of FIGS. 9A, 9B, 9C and 9D, the article 251j of FIGS. 15A, 15B and 15C, or the like) to a position (for example, the position of the article 251m in FIG. 9A or the position of the article 251j in FIG. 15A) that does not come into contact with the first conveying object on the bottom surface of the conveyance destination; and a third process (for example, a process from the state shown in FIG. 9A to the state shown in FIG. 9C or a process from the state shown in FIG. 15A to the state shown in FIG. 15C) in which the manipulator moves the second conveying object in the direction of the first conveying object from the position that does not come into contact with the first conveying object, and moves the first conveying object by further moving the second conveying object after coming into contact with the first conveying object.

Accordingly, when a plurality of articles having different shapes is stored into a box, the housing efficiency in the box can be improved by reducing a gap between the articles.

Here, the manipulator may change the posture of the first conveying object by further moving the second conveying object after coming into contact with the first conveying object in the third process. This corresponds to, for example, the process in which the posture of the article 251i of FIG. 15A is changed in FIG. 15C.

Accordingly, since the deviation of the posture of the article 251 caused by a posture recognition error is corrected, the use efficiency of the volume of the box can be improved.

In addition, the moving direction of the second conveying object in the second process is different from that of the second conveying object in the third process. This corresponds to a difference between the moving direction in which the article 251 is inserted into the sorting box and the moving direction of the shift movement of the inserted article 251 in the above-described embodiment.

Accordingly, an article 251 to be conveyed is inserted at a position where a distance to another article 251 is sufficiently secured, and then the distance between the articles 251 is reduced. Therefore, the article 251 is not damaged at the time of the insertion, and the use efficiency of the volume of the box can be improved after the insertion.

In addition, the manipulator moves the second conveying object in the third process so that a bottom surface of the second conveying object is located at a position higher than that of the first conveying object and lower than an upper surface of the first conveying object. This corresponds to the position of the article 251i with respect to the article 251p shown in FIGS. 5A, 5B, 5C, 5D and 12.

Accordingly, the article 251 to be conveyed is allowed to come into contact with the adjacent article 251 without coming into contact with the bottom surface, and the adjacent article 251 can be moved.

In addition, the first conveying object is put at a position that does not come into contact with the wall surface in the first process.

Accordingly, it is possible to prevent the article 251 from being damaged by hitting the wall surface.

In addition, the first conveying object is put between the wall surface of the conveyance destination and the second conveying object when the second process is completed, and the manipulator may move the first conveying object in the direction of the wall surface by moving the second conveying object in the direction of the wall surface after coming into contact with the first conveying object in the third process. This corresponds to the process in which the article 251m comes into contact with the article 251j and moves the article 251j in the direction of the wall surface as shown in FIG. 9A to FIG. 9D and the article 251j comes into contact with the article 251i and moves the article 251i in the direction of the wall surface as shown in FIG. 15A to FIG. 15G.

Accordingly, since a distance between the article 251 that is put first and the wall surface is reduced, the use efficiency of the volume of the box can be improved.

In addition, a distance by which the first conveying object moves in the direction of the wall surface in the third process is shorter than that between the first conveying object put in the first process and the wall surface. At this time, the robot system is designed by considering at least one of a recognition error (the maximum value thereof is, for example, the sorting box x-direction position recognition maximum error 2804 and the sorting box y-direction position recognition maximum error 2805 of FIG. 28) of the position of the wall surface of the conveyance destination, a recognition error (the maximum value thereof is, for example, the sorting box posture recognition maximum error 2806) of the posture of the wall surface of the conveyance destination, a recognition error (the maximum value thereof is, for example, the article position recognition maximum error 2801) of the position of the conveying object, and a recognition error (the maximum value thereof is, for example, the article posture recognition maximum error 2802) of the posture of the conveying object, and the maximum values of all the considered recognition errors are held. The first conveying object may be put so as not to come into contact with the wall surface even if all the considered recognition errors are the maximum values.

Namely, the variation of "a relative positional relation between the wall surface of the conveyance destination and the conveying object" calculated on the basis of the recognition result of the wall surface of the conveyance destination and the recognition result of the conveying object is considered. In the first process, the maximum value of the variation is determined on the basis of one or more pieces of information among the above-described parameters, and the first conveying object is installed while being separated from the wall surface of the conveyance destination by a value larger than the maximum value of the variation. Then, the first conveying object is moved in the direction of the wall surface of the conveyance destination by the maximum value of the variation in the third process.

Figure 9C:
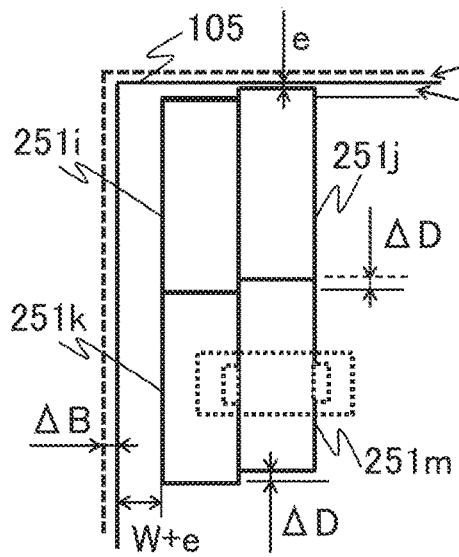
FIG. 9C is an explanatory diagram of an actual installation position including a maximum error in the case where an article is additionally installed using the finger-type hand according to the embodiment of the present invention.
Figure 9D:
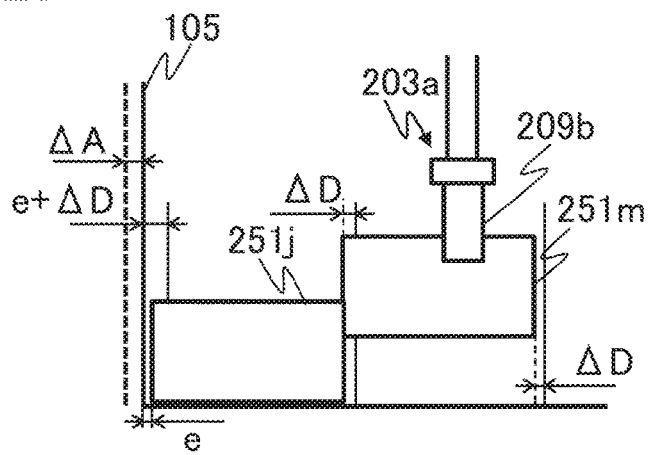
FIG. 9D is an explanatory diagram of an actual installation position including a maximum error in the case where an article is additionally installed using the finger-type hand according to the embodiment of the present invention.

For example, this corresponds to the fact that the movement amount of the article 251j in FIG. 9C is $\Delta D$ whereas a distance from the article 251j before the movement shown in FIG. 9A to the wall surface is $e+\Delta D$, and the movement amount of the article 251i in FIG. 15C is $2\Delta P$ whereas a distance from the article 251i before the movement shown in FIG. 15A to the wall surface is $e+2\Delta P$.

These maximum values of the recognition errors to be considered are parameters that are set in advance before the operation of the robot system. The maximum value (for example, the sorting box x-direction position recognition maximum error 2804 and the sorting box y-direction position recognition maximum error 2805 of FIG. 28) of the recognition error of the position of the wall surface of the conveyance destination and the maximum value (for example, the sorting box posture recognition maximum error 2806) of the recognition error of the posture of the wall surface of the conveyance destination are identified by the following method. First, the sorting box 105 is precisely installed at a stop position in front of the robot 101 by hand on the basis of a design drawing, and the position posture of the sorting box 105 is recognized by operating the sorting box recognition sensor 205 and the box recognition unit 364 of the robot 101. The installation and recognition of the sorting box 105 are repeated a plurality of times by setting a deviation between the recognition result and the design drawing as the recognition error, and the largest recognition error is set to the robot 101 as the maximum value of the recognition error. Likewise, the maximum value (for example, the article position recognition maximum error 2801) of the recognition error of the position of the conveying object and the maximum value (for example, the article posture recognition maximum error 2802) of the recognition error of the posture of the conveying object are identified by the following method. First, the storage box 103 is precisely installed at a stop position in front of the robot 101 by hand on the basis of a design drawing, the article 251 is installed in the storage box 103 by hand, and a relative position posture relation between the storage box 103 and the article 251 is precisely measured using a ruler and a protractor. Then, the position posture of the article 251 is recognized by operating the arm 201, the article recognition sensor 202, and the article recognition unit 365 of the robot 101. The installation, measurement, and recognition of the article 251 are repeated a plurality of times by setting a deviation between the recognition result and the position posture of the article 251 obtained on the basis of the design drawing and the relative position posture relation between the storage box 103 and the article 251 as the recognition error, and the largest recognition error is set to the robot 101 as the maximum value of the recognition error.

The position that does not come into contact with the first conveying object means that the outside of the range of the specified recognition error of the robot system is used as the position where the second conveying object does not come into contact with the first conveying object. Namely, the second conveying object is not inserted into an area that is set by the robot system as the recognition error and has a predetermined distance from the first conveying object, and is inserted into a region outside the area. Accordingly, it is possible to prevent the conveying objects from corning into contact with each other in the process, and thus the success rate of the boxing work can be increased.

In addition, it is accordingly possible to prevent the article 251 from being damaged by hitting the wall surface.

In addition, the manipulator has a gripping unit (for example, the finger-type hand 203a, the suction hand 203b, or the double suction hand 203c) that grips the conveying object, and the gripping unit may have a plurality of fingers (for example, the fingers 209) that grips the conveying object by sandwiching the conveying object. Alternatively, the gripping unit may have a sucking unit (for example, the suction pad 210a, 210b, or 210c) that grips the conveying object by sucking the conveying object.

Accordingly, the present invention can be applied to the sorting work for objects having a variety of shapes.

In addition, the gripping unit (for example, the double suction hand 203c) has two sucking units (for example, the suction pads 210b and 210c). In the second process, a first sucking unit (for example, the suction pad 210b) sucks the second conveying object (for example, the article 251g), the manipulator moves towards a third conveying object (for example, the article 251h), the posture of the third conveying object is changed so as to correspond to the second conveying object after the second conveying object and the third conveying object come into contact with each other, and then the second sucking unit (for example, the suction pad 210c) sucks the third conveying object. The manipulator may move the second conveying object or the third conveying object while coming into contact with the first conveying object in the third process.

Alternatively, a robot system according to the embodiment of the present invention has a manipulator that conveys a conveying object to a conveyance destination having a bottom surface and a wall surface connected to the bottom surface. The manipulator has at least two sucking units (for example, the suction pads 210b and 210c) that grip the conveying object by sucking the conveying object. A first sucking unit grips a first conveying object (for example, the article 251g), and the gripped first conveying object is conveyed in the direction of a second conveying object (for example, the article 251h). The first sucking unit may allow the first conveying object to come into contact with the second conveying object so that the posture (for example, the posture shown in FIG. 18F) of the first conveying object corresponds to that (for example, the posture shown in FIG. 18F) of the second conveying object, and then a second sucking unit may suck the second conveying object.

Accordingly, since two articles 251 are conveyed at the same time, the efficiency of picking can be improved, and the two articles 251 can be put in the box while filling a gap therebetween. Thus, the use efficiency of the volume of the box can be improved. The "filling a gap" means to reduce a gap between the articles or to allow the articles to closely adhere to each other.

In addition, the robot system holds the maximum value (for example, the article position recognition maximum error 2801 of FIG. 28) of the recognition error of the position of the conveying object and the maximum value (for example, the article posture recognition maximum error 2802) of the recognition error of the posture of the conveying object. In the second process, the position that does not come into contact with the first conveying object is the position (for example, the position of the article 251m of FIG. 9A or the position of the article 251j of FIG. 15A) where the second conveying object does not come into contact with the first conveying object even if all of the recognition error of the position of the first conveying object, the recognition error of the posture of the first conveying object, the recognition error of the position of the second conveying object, and the recognition error of the posture of the second conveying object are the largest.

Accordingly, it is possible to prevent the newly-conveyed article 251 from being damaged by hitting the article 251 that has already been put.

Alternatively, a robot system according to the embodiment of the present invention has a manipulator that conveys a conveying object to a conveyance destination. In the case where a first conveying object has already been put in the conveyance destination, the manipulator may grip and move a second conveying object until the second conveying object comes into contact with the first conveying object, and then may move the first conveying object by further moving the second conveying object. This corresponds to, for example, the process from the state shown in FIG. 9A to the state shown in FIG. 9C, or the process from the state shown in FIG. 15A to the state shown in FIG. 15C.

Accordingly, when a plurality of articles having different shapes is stored into the box, the housing efficiency in the box can be improved by further reducing a gap between the articles.

In addition, the movement of the second conveying object until the second conveying object comes into contact with the first conveying object includes first movement (for example, movement for insertion) to a target position where the second conveying object does not come into contact with the first conveying object and second movement (for example, the shift movement) from the target position to the position where the second conveying object comes into contact with the first conveying object. Further, the direction of the first movement may be different from that of the second movement at this time.

Accordingly, an article 251 to be conveyed is inserted at a position where a distance to another article 251 is sufficiently secured, and then the distance between the articles 251 is reduced. Therefore, the article 251 is not damaged at the time of the insertion, and the use efficiency of the volume of the box can be improved after the insertion.

It should be noted that the present invention is not limited to the above-described embodiment, and includes various modified examples. For example, the embodiment has been described in detail in order to better understand the present invention, and it is not necessary to include all the configurations described above.

In addition, a part or all of each configuration, function, processing unit, processing means, and the like described above may be realized using hardware by designing with, for example, integrated circuits. In addition, each configuration, function, and the like described above may be realized using software by interpreting and executing a program realizing each function by a processor. Information such as a program, a table, and a file realizing each function can be stored in a storage device such as a non-volatile semiconductor memory, a hard disk drive, or an SSD (Solid State Drive), or a computer-readable non-transitory data storage medium such as an IC card, an SD card, or a DVD.

In addition, the control lines and the information lines considered to be necessary in the description are shown, and all the control lines and the information lines required for products are not necessarily shown. It can be considered that almost all the configurations are actually connected to each other.

What is claimed is:

1. A robot system configured to perform a conveyance process, the robot system comprising:
   a conveyance destination having a bottom surface and a wall surface connected to the bottom surface;
   a manipulator that conveys a conveying object to the conveyance destination,
   a processor for controlling the robot system, wherein
   the manipulator puts a first conveying object on the bottom surface of the conveyance destination,
   a first predetermined height relationship wherein a bottom surface of a second conveying object is at a higher position than a bottom surface of the first conveying object and at a lower position than an upper surface of the first conveying object, and
   a second predetermined height relationship wherein a gripping unit of the manipulator is at a higher position than the upper surface of the first conveying object,
   the manipulator moves the second conveying object in the direction of the first conveying object from the position that does not come into contact with the first conveying object, and moves the first conveying object by further moving the second conveying object after coming into contact with the first conveying object, and
   the manipulator moves the second conveying object in a direction containing at least horizontal components and moves the first conveying object by further moving the second conveying object after a part of the second conveying object lower than the gripping unit is in contact with the first conveying object,
   the part of the second conveying object is closer to the bottom surface than the gripping unit is to the bottom surface,
   wherein each of the first and second predetermined height relationships is maintained during the process in which the manipulator moves the second conveying object in the direction of the first conveying object from the position that does not come into contact with the first conveying object.

2. The robot system according to claim 1, wherein the manipulator changes the posture of the first conveying object by further moving the second conveying object after coming into contact with the first conveying object.

3. The robot system according to claim 1, wherein the moving direction of the second conveying object in the second process is different from that of the second conveying object.

4. The robot system according to claim 1, wherein the first conveying object is put at a position that does not come into contact with the wall surface when the first conveying object is placed in the conveyance destination.

5. The robot system according to claim 1, wherein the gripping unit grips the conveying object, and wherein the gripping unit has a plurality of fingers that grips the conveying object by sandwiching the conveying object.

6. The robot system according to claim 1, wherein a variation range of a relative positional relation between the first conveying object and the conveyance destination is preliminarily held, and
wherein a position that does not come into contact with the first conveying object is located at a position out of the variation range when the second conveying object is originally placed in the conveyance destination.

7. The robot system according to claim 1, wherein the gripping unit grips the conveying object, and wherein the gripping unit has a sucking unit that grips the conveying object by sucking the conveying object.

8. The robot system according to claim 7, wherein the gripping unit has two sucking units,
wherein when the second conveying object is originally placed in the conveyance destination, a first sucking unit sucks the second conveying object, the manipulator moves towards a third conveying object, the second conveying object and the third conveying object come into contact with each other so that the posture of the third conveying object is changed so as to correspond to the second conveying object, and then the second sucking unit sucks the third conveying object, and
wherein the manipulator moves the second conveying object or the third conveying object while coming into contact with the first conveying object.

9. The robot system according to claim 1, wherein the first conveying object is put between the wall surface of the conveyance destination and the second conveying object when the second conveying object is originally placed in the conveyance destination, and
wherein the manipulator moves the first conveying object in the direction of the wall surface by moving the second conveying object in the direction of the wall surface after coming into contact with the first conveying object.

10. The robot system according to claim 9, wherein a distance by which the first conveying object moves in the direction of the wall surface when the first conveying object and second conveying object are in contact is shorter than that between the first conveying object put when the first conveying object is placed in the conveyance destination and the wall surface.

11. The robot system according to claim 10,
wherein at least one of a recognition error of a position of the wall surface of the conveyance destination, a recognition error of the position of the first conveying object, and a recognition error of the posture of the first conveying object is considered,
wherein maximum values of all the considered recognition errors are held, and
wherein the manipulator puts the first conveying object so as not to come into contact with the wall surface in the first process even if all the considered recognition errors are the maximum values.

12. A robot system configured to perform a conveyance process, the robot system comprising:
a conveyance destination having a bottom surface and a wall surface connected to the bottom surface;
a manipulator that conveys a conveying object to the conveyance destination,
a processor for controlling the robot system, wherein the manipulator has at least two sucking units that grip the conveying object by sucking the conveying object,
a first sucking unit grips a first conveying object,
the gripped first conveying object is conveyed in the direction of a second conveying object,
the first sucking unit allows the first conveying object to come into contact with the second conveying object so that the posture of the first conveying object corresponds to that of the second conveying object, and then a second sucking unit sucks the second conveying object,
a first predetermined relationship wherein a bottom surface of the second conveying object is moved at a higher position than a bottom surface of the first conveying object and at a lower position than an upper surface of the first conveying object, and
a second predetermined height relationship wherein the second sucking unit is at a higher position than the upper surface of the first conveying object, and
the second sucking unit moves the second conveying object in a direction containing at least horizontal components and moves the first conveying object by further moving the second conveying object after a part of the second conveying object lower than the sucking unit is in contact with the first conveying object,
the part of the second conveying object is closer to the bottom surface than the second sucking unit is to the bottom surface,
wherein each of the first and second predetermined height relationships is maintained during the process in which the manipulator moves the second conveying object in the direction of the first conveying object from the position that does not come into contact with the first conveying object.

13. A control method for a conveyance process by a robot system having a manipulator that conveys a conveying object to a conveyance destination having a bottom surface and a wall surface connected to the bottom surface and a processor for controlling the robot system, the method comprising:
putting, via the manipulator, a first conveying object on the bottom surface of the conveyance destination;
conveying, via the manipulator, a second conveying object to a position that does not come into contact with the first conveying object on the bottom surface of the conveyance destination,
a first predetermined relationship wherein a bottom surface of the second conveying object is at a higher position than a bottom surface of the first conveying object and at a lower position than an upper surface of the first conveying object, and
a second predetermined height relationship wherein a gripping unit of the manipulator is at a higher position than the upper surface of the first conveying object,
moving, via the manipulator, the second conveying object in the direction of the first conveying object from the position that does not come into contact with the first conveying object, and moves the first conveying object by further moving the second conveying object after coming into contact with the first conveying object, and
the manipulator moves the second conveying object in a direction containing at least horizontal components and moves the first conveying object by further moving the second conveying object after a part of the second conveying object lower than the gripping unit is in contact with the first conveying object,
the part of the second conveying object is closer to the bottom surface than the gripping unit is to the bottom surface,
wherein each of the first and second predetermined height relationships is maintained during the process in which the manipulator moves the second conveying object in the direction of the first conveying object from the position that does not come into contact with the first conveying object.

* * * * *